United States Patent [19]

Shibanuma et al.

[11] Patent Number: 5,173,248
[45] Date of Patent: Dec. 22, 1992

[54] REMOTE CONTROL APPARATUS FOR MAINTAINING IN-VESSEL COMPONENTS IN A STRUCTURE HAVING AN INNER TORUS SPACE

[75] Inventors: Kiyoshi Shibanuma, Tokyo; Shin Murakami, Hachioji; Tadashi Munakata, Tokyo; Yoshinobu Ishikawa, Hino, all of Japan

[73] Assignee: Kabushiki Kaisha Toshiba, Kawasaki, Japan

[21] Appl. No.: 654,056

[22] Filed: Feb. 12, 1991

[30] Foreign Application Priority Data

Feb. 14, 1990 [JP] Japan ................................. 2-32729
Nov. 30, 1990 [JP] Japan ................................. 2-340600
Nov. 30, 1990 [JP] Japan ................................. 2-340601

[51] Int. Cl.$^5$ ........................................... G21C 19/00
[52] U.S. Cl. ................................... 376/260; 376/249
[58] Field of Search ...................... 376/249, 260, 143

[56] References Cited

PUBLICATIONS

"The TFTR Maintenance Manipulator" by M. Selig et al. (Proceedings of a Technical Committee Meeting on Robotics and Remote Maintenance Concepts for Fusion Machines–Karlsruhe, Feb. 22–24, 1988).
Proceedings of a Technical Committee Meeting "Robotics and Remote Maintenance Concepts For Fusion Machines" International Atomic Energy Acency, Vehicle Concept for Net In-Vessel Inspection and Maintenance, D. Maisonnier; Feb. 22–24, 1988.
"Robotics and Remote Maintenance Concepts for Fusion Machines"; Iaea-Tecdoc-495, Vienna (1989), pp. 151–161; D. Maisonnier.

Primary Examiner—Brooks H. Hunt
Assistant Examiner—Frederick H. Voss
Attorney, Agent, or Firm—Oblon, Spivak, McClelland, Maier & Neustadt

[57] ABSTRACT

A remote control apparatus for maintaining a tokamak type nuclear fusion reactor comprises a rail having a plurality of arcuated links to be extended in a circumferential direction and a plurality of joints for pivotally connecting the adjacent arcuated links, a vehicle running on the rail extended so as to form a continuous arc with its center substantially coinciding with the center of the torus space, and at least one handling device mounted on the vehicle, for handling the in-vessel components. The remote control apparatus is further provided with a rail housing device for receiving the arcuated links in a folded state when they are not in use, a rail mounting device for sending out said arcuated links in succession into the torus space, extending them so that they form a continuous arc and supporting the arcuated link on the proximal end of the rail, and a rail supporting device for supporting the central portion of the rail extended in the torus space.

22 Claims, 28 Drawing Sheets

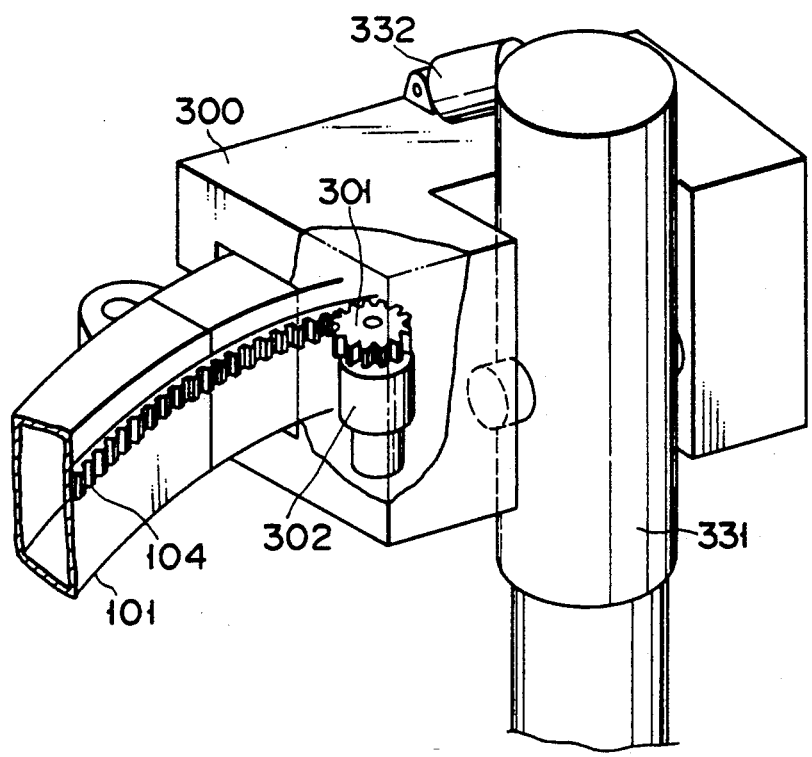
F I G. 4
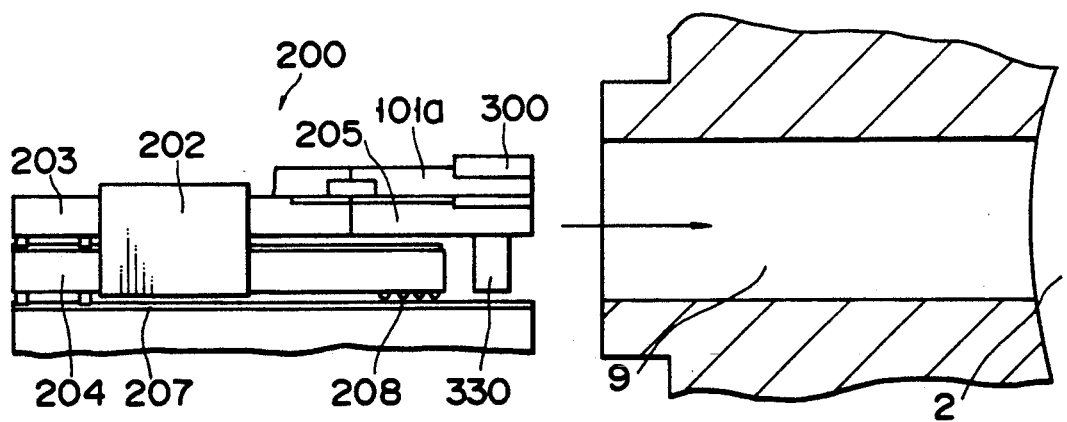
F I G. 5

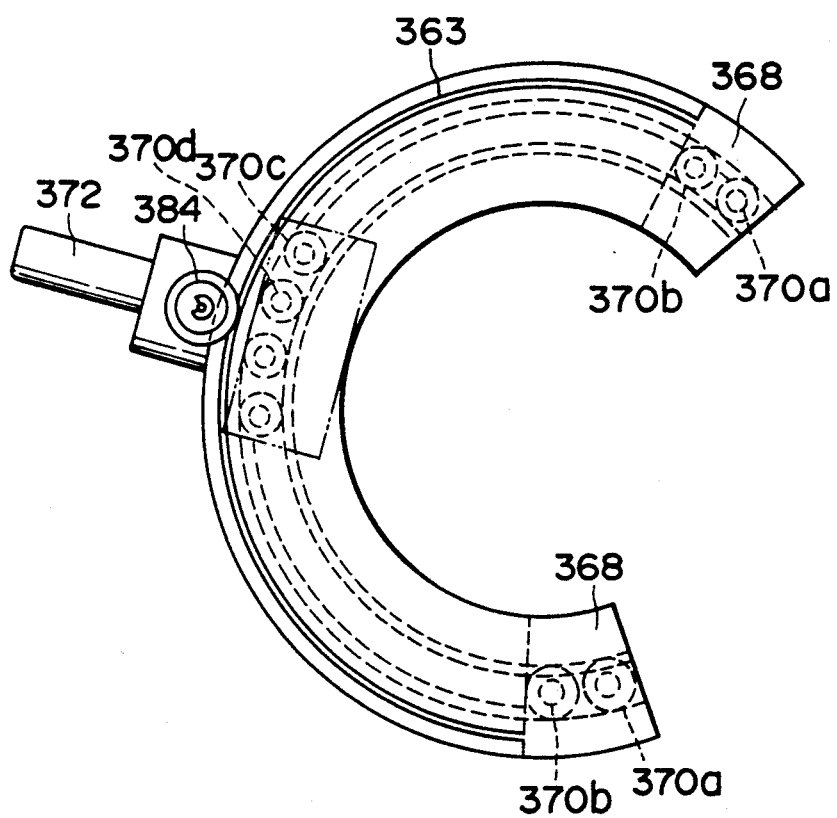
F I G. 25

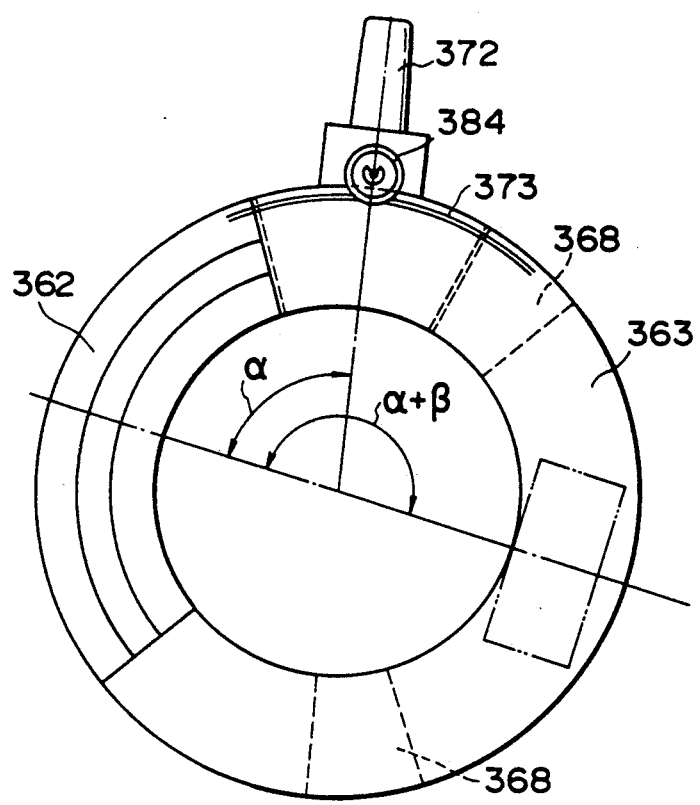
F I G. 26
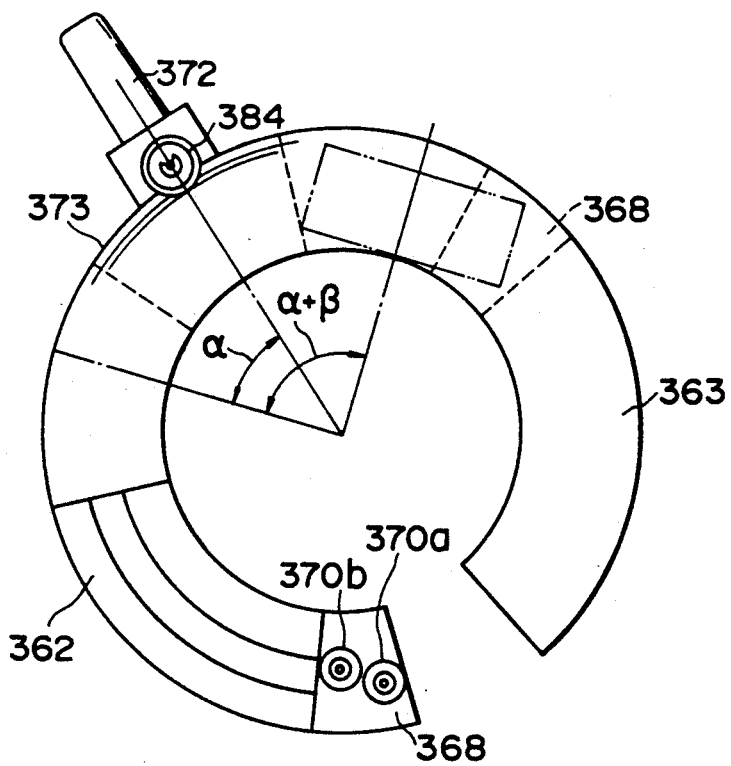
F I G. 27

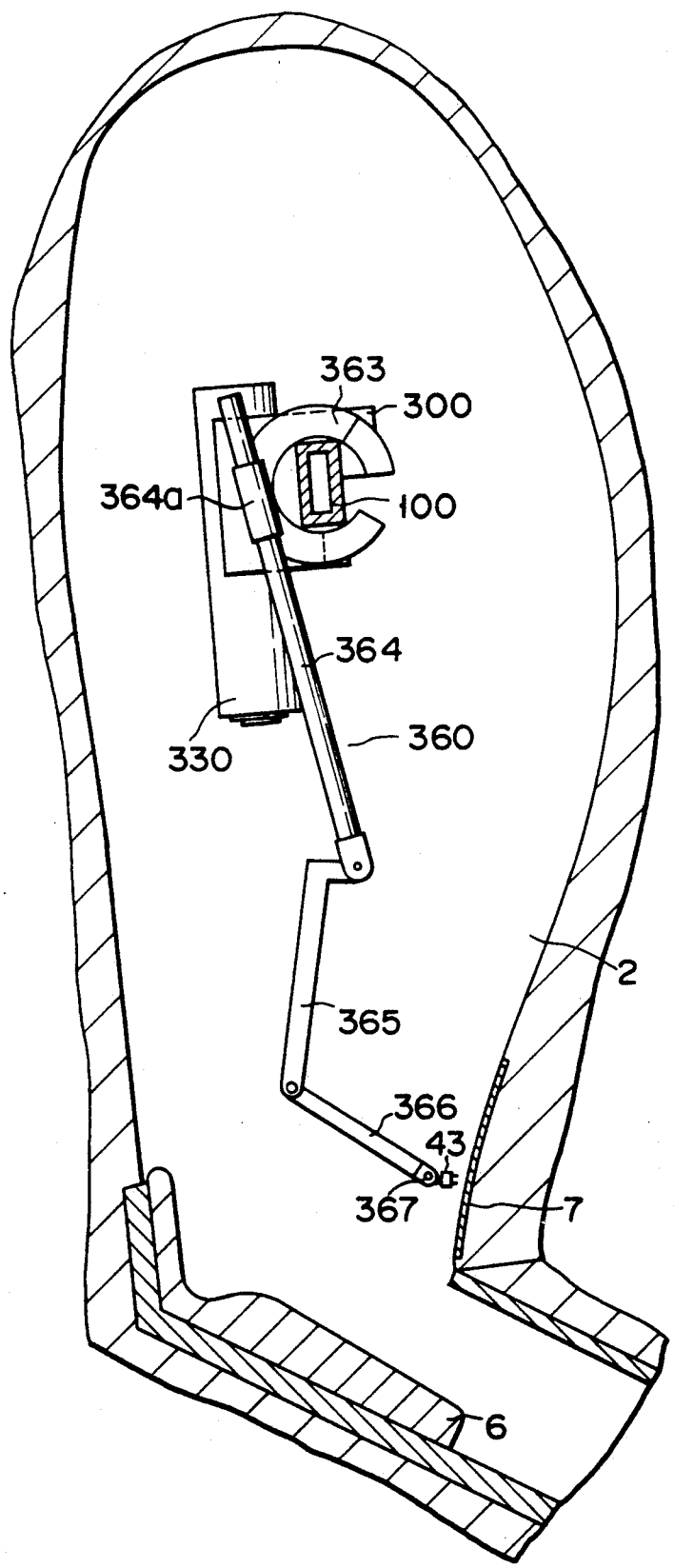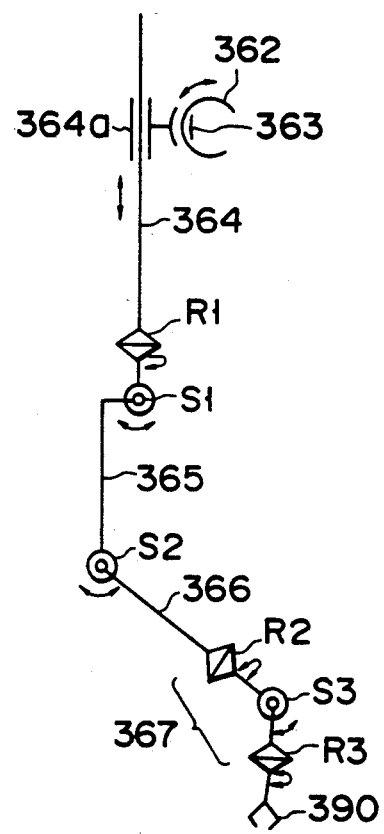
F I G. 28
F I G. 29

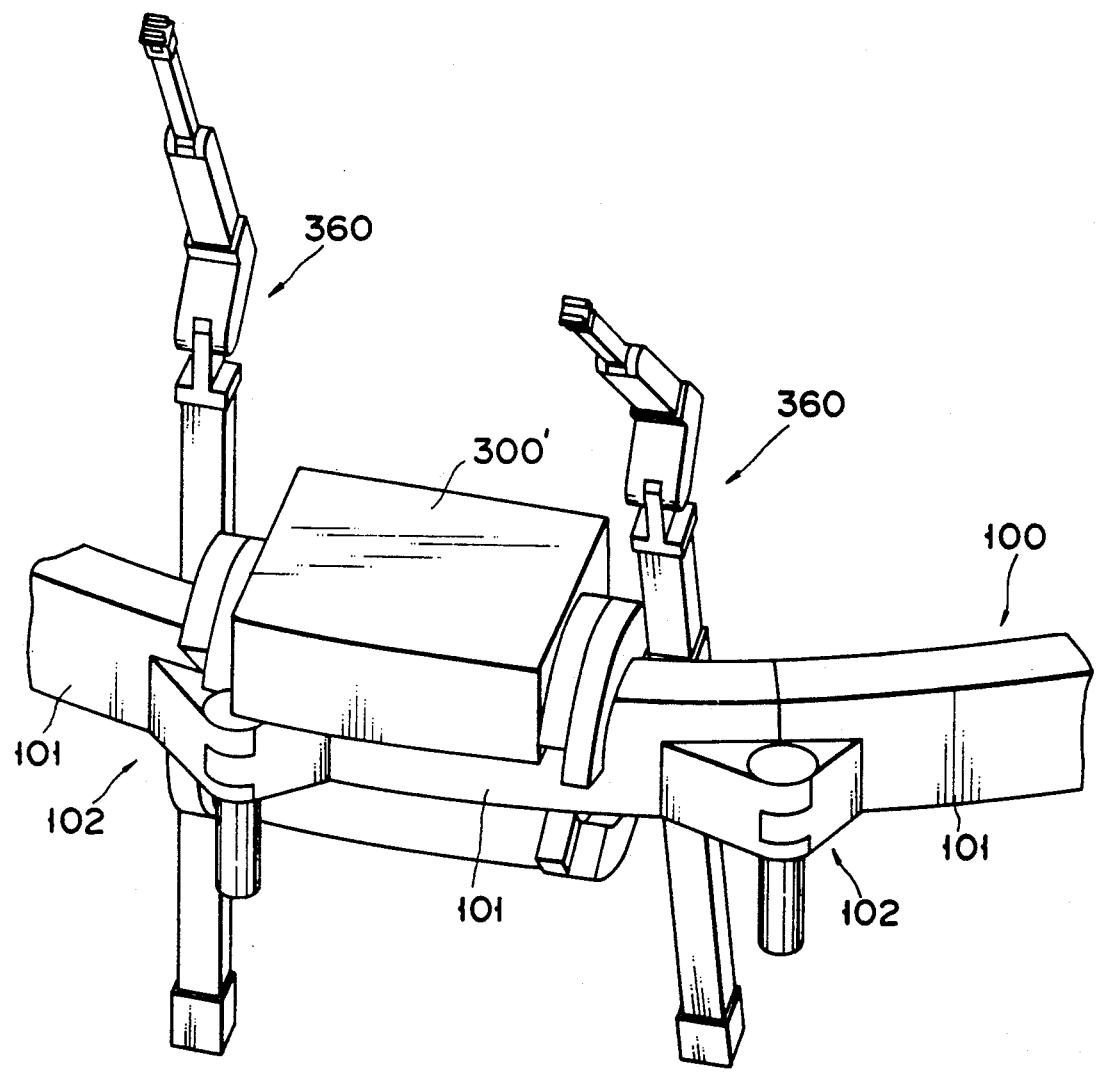
F I G. 30

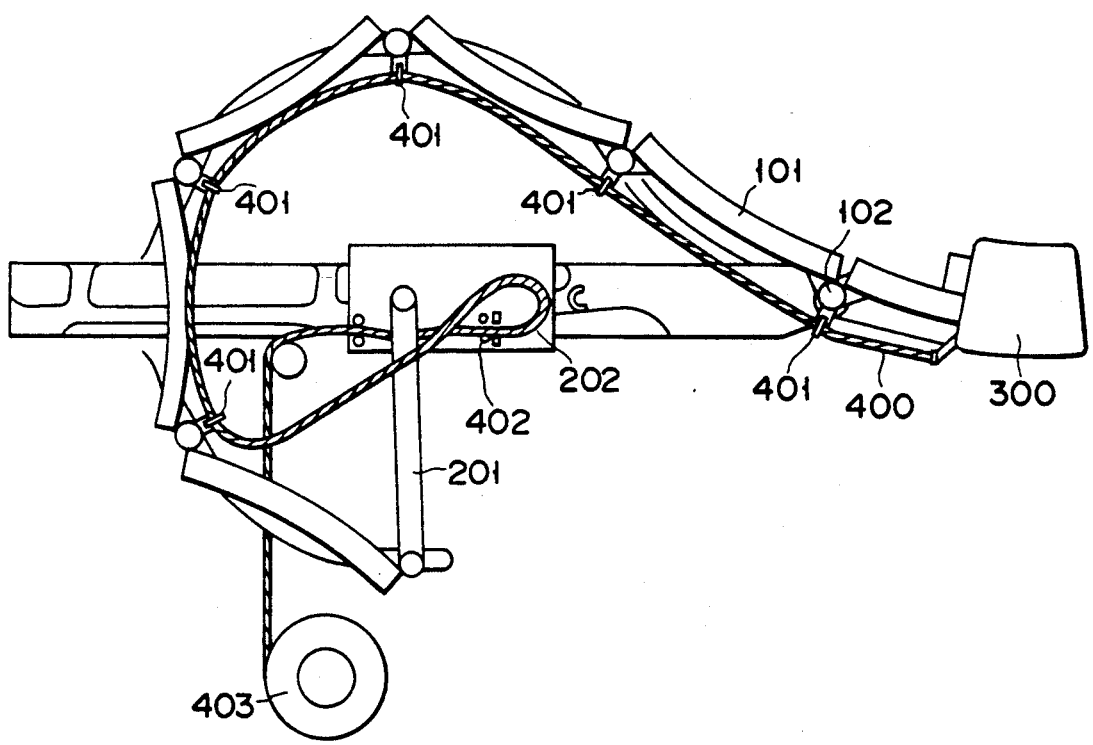
F I G. 31

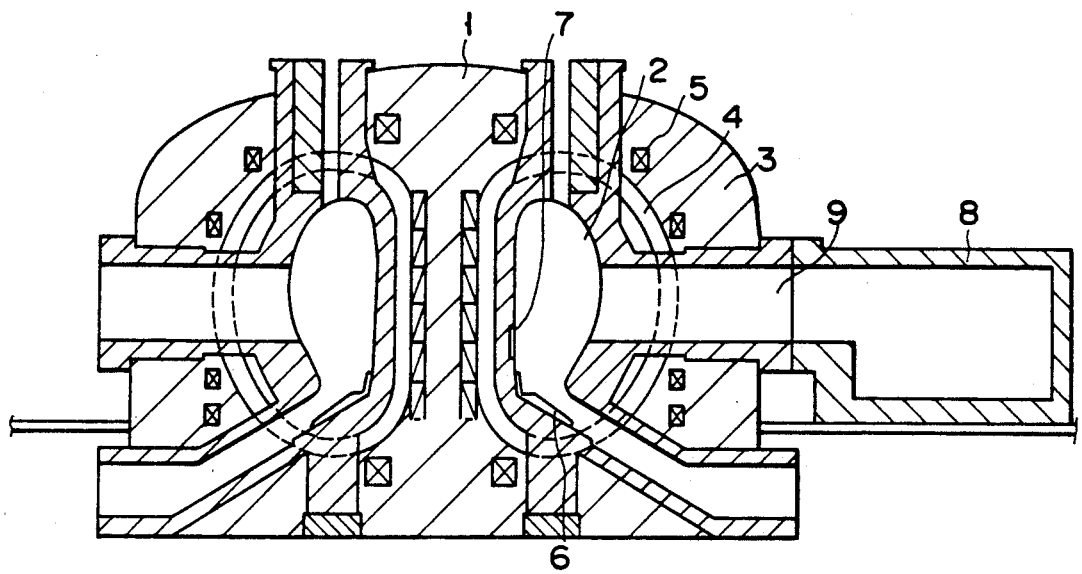
F I G. 34

REMOTE CONTROL APPARATUS FOR MAINTAINING IN-VESSEL COMPONENTS IN A STRUCTURE HAVING AN INNER TORUS SPACE

BACKGROUND OF THE INVENTION

1. Field of the Invention

This invention relates to a remote control apparatus for maintaining in-vessel components in a structure having an inner torus space, and in more particular to a remotely controlling maintenance apparatus adapted for a tokamak type nuclear fusion reactor.

2. Description of the Related Art

With a nuclear fusion reactor in which a D-T reaction occurs, the maintenance of the in-vessel components must always be remotely controlled in order to protect the operator from radiation produced in the reactor after it begins to be run.

As shown in FIG. 34 the tokamak type nuclear fusion reactor has a hollow donut shape vessel 1, the torus space 2 of which has an outer diameter of substantially 10 meters and which is covered with a shield member 3 having a thickness of several meters. The peripheral components such as a toroidal coil 4 and a poloidal coil 5 surround the inner torus space 2 in a complicated manner. Accordingly, it is necessary to insert a maintenance device housed in a cask 8 disposed outside of the reactor into the torus space 2 through maintenance ports 9 each extending radially of the torus space 2 and further to move the maintenance device in the circumferential directions in the space 2 so that the maintenance device is accessible to the in-vessel components such as diverter plates 6 and first wall armor tiles 7 without interference with the peripheral components. Since the in-vessel components include very heavy components such as the diverter plate weighing more than 1 ton, these heavy components impose many technical problems on a maintenance device.

The conventional maintenance devices are classed into two types. One of them has, as shown in FIG. 35, a cantilever type multi-joint arm (articulated arm) 10 which has its base joint disposed at the outside of the reactor. The arm 10 is inserted in the torus space 2 through the maintenance port 9 to have access to the in-vessel components. The maintenance devices of this type have been used in the United States and Europe. However, as the vessel becomes larger and larger, the articulated arm becomes longer and longer. In addition, the in-vessel components to be handled become heavier. These make it difficult to accurately set the distal end of the articulated arm 10 at a required position. Further, the maintenance device of this type has the problem that its operational efficiency and reliability are lowered because the long overall articulated arm 10 must be moved in the narrow torus space 2 at each time when the in-vessel components are handled. An example of the maintenance devices of this type is disclosed in the thesis titled "THE TFTR MAINTENANCE MANIPULATOR" by M. Selig et. al. (Proceedings of a Technical Committee Meeting on Robotics and Remote Maintenance Concepts for Fusion Machines—Karlsruhe, Feb. 22-24, 1988—issued by The International Atomic Energy Agency).

The maintenance device of the other type has a vehicle which runs on a rail laid in the torus space so that the vehicle is accessible to the in-vessel components to handle them. The maintenance device of this type has the features that the positioning of the vehicle at the time of access to the in-vessel components is accurately carried out due to one degree of freedom defined by the running of the vehicle on the rail and that the in-vessel components are efficiently transported. An example of the rail-mounted devices is disclosed in the thesis titled "VEHICLE CONCEPT FOR NET IN-VESSEL INSPECTION AND MAINTENANCE" by D. Maisonnier (Proceedings of a Technical Committee Meeting on Robotics and Remote Maintenance Concepts for Fusion Machines—Karlsruhe, Feb. 22-24, 1988—issued by The International Atomic Energy Agency).

Maisonnier's system comprises two boom rails extended through 90° in the torus space. The boom rails are inserted therein through the opposed maintenance ports and connected at their front ends to form a vehicle-guiding rail extending through 180° in the torus space. Each boom rail comprises three curved box-like link elements serially articulated at their ends to one after another. Maisonnier's thesis only briefly describes that the joint of each link member is driven by a lever mechanism and depicts that each link element contains a drive rod for driving the corresponding joint. The vehicle moves radially outwardly along the rail.

In the rail system, the semi-circularly extended rail is supported on its both ends so that the rigidity can be made larger than the articulated arm as shown in FIG. 35.

However, the semi-circularly arcuated rail is supported only on both ends and it cannot be supported at its central portion because the vehicle is moved along the radially outer side of the rail. When a heavy invessel component is handled by the vehicle at the central portion of the rail, a large bending moment and a large torsional moment are exerted on and at the vicinity of the end portion of the rail at which the rail is supported so that the rail is likely to be bent. Therefore, the arcuated links forming a boom rail must be rendered large in size as well. For example, when the radius curvature of the rail is 5,200 mm, the height, the width and the length of the links should be 1,000 mm, 150 mm and 2,250 mm, respectively. A large space for storing the rail is required. Further, the rail requires complicated mechanisms such as lever mechanisms for extending and shrinking the rail and drive rods. This requires complicated control when the rail is extended in the vessel.

A circular arc telescope type rail system can be used to extend a rail in the torus space. However, it has the drawback that its reliability is lowered when it remains exposed under radiation of a high level during a long maintenance time, because an actuator or a complicated driving mechanism must be provided in the rail.

Further, the thickness of the telescope rail is not constant throughout the whole length. This makes it difficult to guide and move the vehicle in a stable state and makes the structure and the control of the rail complicated.

SUMMARY OF THE INVENTION

The object of the invention is to provide a remote control maintenance apparatus which has a high operational efficiency and reliability and is particularly useful for a tokamak nuclear fusion reactor.

In order to attain the object, this invention provides a remote control apparatus for maintaining a structure which comprises a vessel having a torus space formed therein and a plurality of maintenance ports extending radially for causing the torus space to communicate with the outside of the vessel and components arranged in the vessel, comprising:

a rail having generally similarly arcuated links pivoted to one after another and extensible in the circumferential directions in the torus space, the links forming, in the torus space, a continuous semi-circular arc having a center substantially coincident with the center of the torus space when the links are extended;

a vehicle carrying at least one manipulator for handling the components and guided along the rail extended in the torus space;

rail housing means arranged outside of the vessel, for housing the rail when the remote control device is not used;

rail mounting means carrying the last link of the rail and delivering, into the torus space, the links housed in the rail housing means from the first link to the last link in succession through one of the maintenance ports and causing the links to form the continuous semi-circular arc; and a rail supporting device inserted in the torus space through another maintenance port adjacent to the first mentioned maintenance port, for supporting the central portion of the rail.

In this remote control maintenance apparatus, the rail comprises a plurality of links and joints for articulating the adjacent links and each provided with a locking mechanism for locking the respective link at the position in which the arcuated links form the semi-circular arc and the rail is transmitted into the torus space by means of a transmitting mechanism. In this respect, the arcuated links can be housed in the rail housing means having a limited space. Further, when the rail is transmitted into the torus space, the links are delivered from the first one to the last one in succession by means of the rail mounting device, whereby the links pass through a narrow maintenance port easily. The rail formed in a continuous circular arc shape is supported by means of the rail supporting device inserted from another maintenance port adjacent to the first mentioned maintenance port. This not only renders the rigidity of the rail high and the movement of the vehicle stable but also minimizes the overall apparatus.

Further, the stable operation of the vehicle makes the operation of the manipulator mounted on the vehicle stabilized, enabling the components to be handled at a high operational efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a schematic perspective view of vehicle driving means of this embodiment;

FIG. 5 is a side view of a first slide link and a second slide link housed on the cask;

FIGS. 25 to 27 illustrate the operation of two rings of the manipulator for maintaining armor tiles of FIG. 22;

FIG. 28 illustrates the operation of the manipulator for maintaining armor tiles of FIG. 22;

FIG. 29 shows the degree of freedom of the manipulator for maintaining armor tiles of FIG. 22;

FIG. 30 is a perspective view of the second embodiment of the vehicle on which two manipulators for maintaining armor tiles;

FIG. 31 is a plan view of the housed cable when the rail is housed in the cask;

FIG. 34 is a longitudinal cross-sectional view of a tokamak type nuclear fusion reactor.

DETAILED DESCRIPTION OF THE PREFERRED EMBODIMENTS

Figure 1:
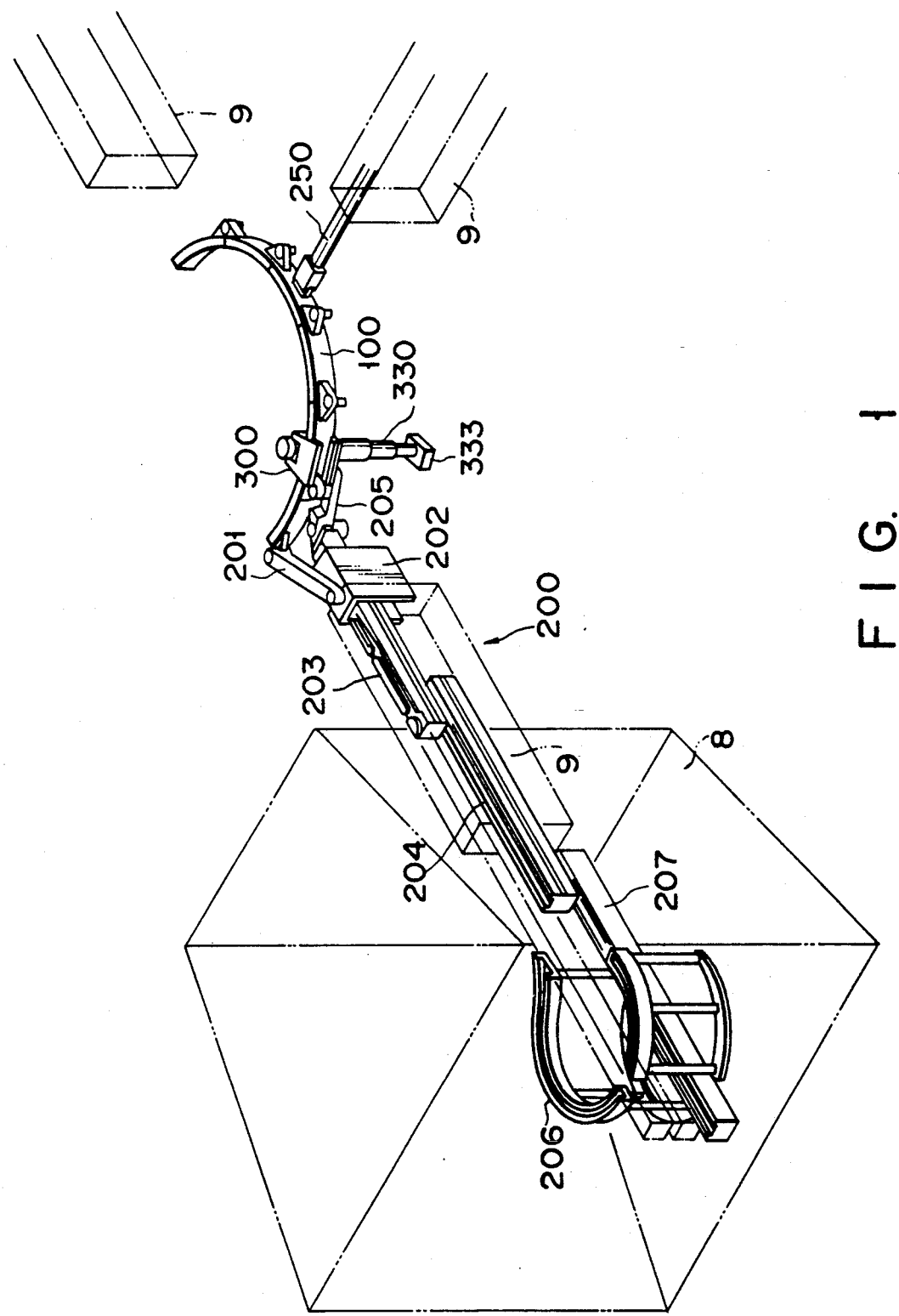
FIG. 1 is a schematic perspective view of one embodiment of the remote control maintenance apparatus according to this invention.

FIG. 1 shows an embodiment of a remote control maintenance apparatus according to this invention.

As described above, this remote control maintenance apparatus is intended to maintain the in-vessel components in the tokamak type nuclear fusion reactor 1 which, in general, comprises a vessel forming a torus space 2, casks 8 arranged around the vessel, and four maintenance ports 9 for causing the casks 8 to communicate with the torus space 2 (FIG. 34).

The remote control maintenance apparatus disclosed in FIG. 1 is inserted in the torus space 2 through one of the maintenance ports 9. The apparatus comprises a rail 100 and a vehicle 300 on which a manipulator 330 is mounted and which runs on the rail 100. When the remote control maintenance apparatus is not used, the rail 100 is contained in a rail housing guide 206 provided in the respective cask 8. When the in-vessel components must be maintained, on the other hand, the rail 100 is extended into the torus space 2 by means of a rail mounting device 200 which has a first and second slide links 203, 204 expandable toward the center of the torus space 2 to move the rail 100 from the interior of the cask 8 into the tours space 2 and a support arm 205, swingably mounted on the front end of the first slide link 203, detachably holding the vehicle 300. In this connection, the rail housing guide 206 and the rail mounting device 200 are also the elements of the remote control maintenance apparatus.

By means of the rail mounting device 200, the rail 100 is moved from the rail housing guide 206 into the torus space 2 along the first and second slide links 203 and 204, and extended by the length corresponding to half the circumferential length of the torus space or its circumferential angle of 180°, and thereafter the rail 100 is rigidly fixed by one or more rail supporting devices 250 inserted in the torus space 2 through one or more maintenance ports a adjacent to each other through which the remote control apparatus or remote control apparatuses are guided.

The remote control maintenance apparatus can be provided with rails 100 extending, in combination, by 360° along the circumference of the torus space 2 by using two rail mounting devices 200, or can be provided with a rail 100 extending half the circumferential length of the torus space or its circumferential angle of 180°. In both cases, the laying of the rail 100 and the maintenance by using the vehicle 300 are similarly carried out.

Explanation of the remote control maintenance apparatus will be made according to the following steps:

1. the step in which the arcuated rail is housed in the cask,
2. the step in which the apparatus is moving in the maintenance port 9,
3. the step in which the apparatus is moving in the torus space 2,
4. the step in which the apparatus is extended and supported by the rail supporting device 250, the state being shown in FIG. 1,
5. the step in which the vehicle 300 is moved along the rail 100 and the diverter plate 6 is changed by means of the manipulator 330 mounted on the vehicle 300,
6. the step in which the apparatus is restored in the cask 8,
7. the step in which a manipulator 360 (described later) for maintaining a first wall 7 of an armor tile, and
8. the operation of a cable.

1. The step in which the rail 100 is housed in the cask

Figure 2:
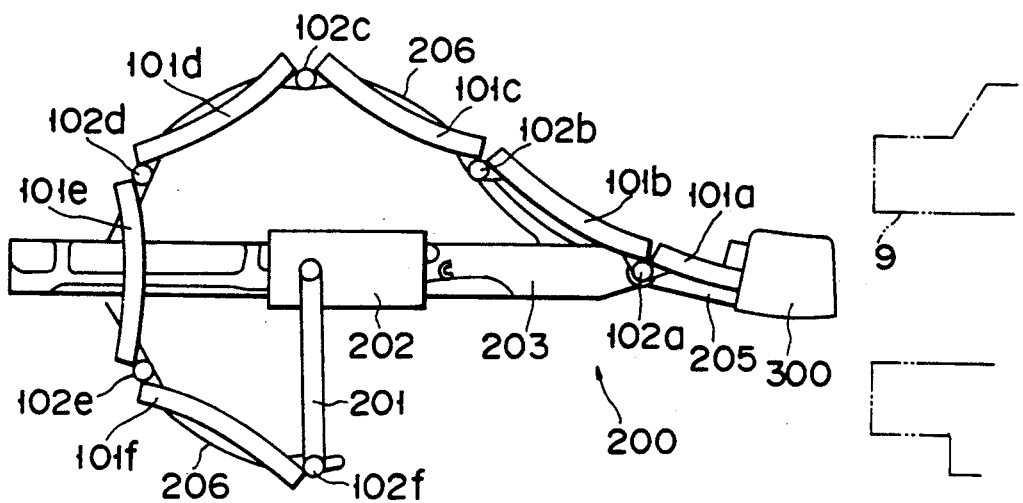
FIG. 2 is a schematic plan view of a rail in a state in which the rail is housed in a cask in this embodiment.

FIG. 2 is a plan view of the rail 100 in the state in which it is housed in the cask.

In this embodiment, the rail 100 comprises six arcuated links 101a, 101b, 101c, 101d, 101e and 101f arranged from the distal end toward the proximal end of the rail 100 in this order and joints 102a, 102b, 102c, 102d, 102e and 102f arranged from the distal end toward the proximal end of the rail 100 in this order, for pivotally connecting adjacent links. It is noted that referential numerals 101 and 102 will be used for the link or links and the joint or joints when they are not specified. As shown in FIG. 2, the links 101 can rotate radially outwardly of the arc defined by each link 101 itself around the corresponding joints 102 but cannot pivot radially inwardly of the arc beyond a continuous semicircular arc formed by all the links 101. When each link 101 has a radius of curvature of 4500 mm, the width of 250 mm and the height of 500 mm can be selected. In this case, each link 101 may have a hollow structure with a wall thickness of 20 mm by selecting a suitable material.

A swing link 201 is connected to the link 101f at the proximal end of the rail 100 by means of the joint 102f and is swingably supported on the upper surface of a rail carriage 202 which is a part of a rail mounting device 200. The rail carriage 202 has means for driving the swing link 201 (the means being not shown), a slide link driving mechanism (not shown) for driving a first slide link 203 and a second slide link 204 both adapted to move the rail. The second link 204 is hidden under the first slide link 203 in FIG. 2.

A support arm 205 is pivotally supported on the first slide link 203 so as to be rotated with respect to the first slide link 203 by the driving means (not shown) around an axis substantially coinciding with the axis of the joint 102a. A vehicle 300 is detachably connected to the distal end of the arm 205 by means of a vehicle holding mechanism (not shown).

A maintenance port 9 is provided in front of first slide link 203 on the extension therefrom.

Figure 3:
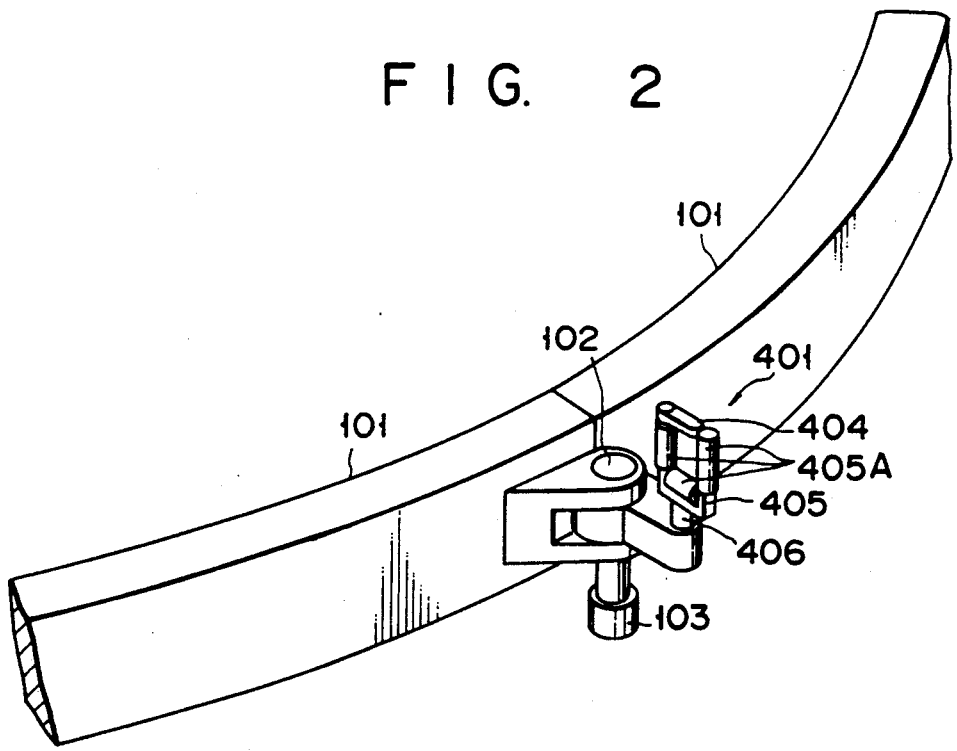
FIG. 3 is a perspective view of a joint of the rail of this embodiment.

As shown in FIG. 3, a rotatable joint roller 103 is provided under each joint 102 so as to be arranged coaxial therewith. The joint roller 103 is fitted in a guide groove formed in an arcuated rail-housing guide 206 (FIG. 2) and its movement in the radial directions of the arc defined by the swing link 201 is restricted. The undersurface of each link 101 is slidably supported on the upper surface of the rail-housing guide 206. The distal end portion of the first link 101a of the rail 100 is received in the vehicle 300 running on the rail 100. A cable support 401 is provided for guiding a cable (later described) which supplies power to the vehicle 300 and transmits signals between the vehicle 300 and a control device. The cable support 401 has a cable receiver 405 having a generally U shape and pivoted to the joint 102 by a support shaft 406. A lever 404 bridges the upper ends of the cable receiver 405 and is pushed to be turned outside thereof. The cable receiver 405 is provided with three rollers 405A for preventing the cable from being damaged.

As shown in FIG. 4, a rack 104 is formed on the arcuated inner face of the arcuated links 101 and the vehicle is provided with a pinion 301 engaging therewith and a driving mechanism or driving means 302 comprising such as a servo motor and a reduction device.

FIG. 5 is a side view of rail mounting means 200 facing the maintenance port 9. The first slide link 203 is supported slidably in its lengthwise directions on the second slide link 204 disposed thereunder and is driven by driving means (not shown). The second slide link 204 is mounted slidably in its lengthwise directions on a fixed guide 207 and is provided with driving means (not shown) for driving the second slide link 204. On the distal end portion of the undersurface of the second slide link 204 are arranged a plurality of rollers 208 which form a bogie structure so that the second slide link 204 is guided on the floor surface of the maintenance port 9 when the second slide link 204 enters the maintenance port 9.

2. The step in which the rail is being moved in the maintenance port

Figure 6:
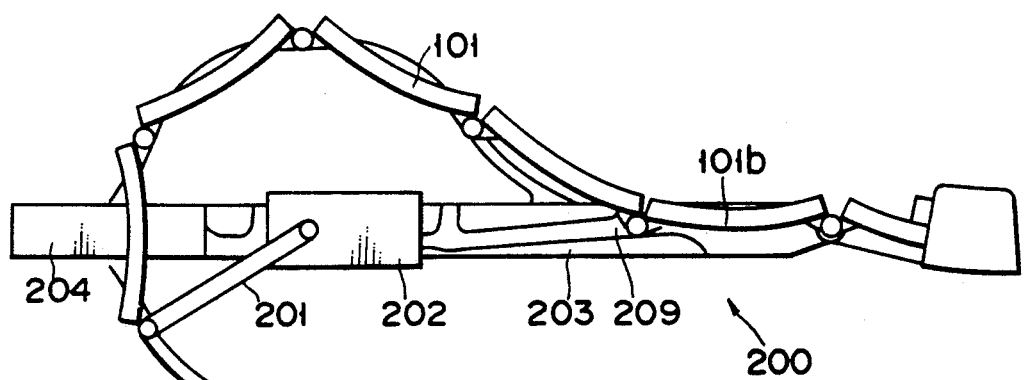
FIG. 6 is a schematic plan view showing the state in which the distal end of the rail is extended in a maintenance port together with the first slide link.

FIG. 6 shows the state in which the distal end portion of the rail 100 together with the first slide link 203 move toward the center of the torus space 2 in the maintenance port 9. As shown in FIG. 6, the first slide link 203 slides on the second slide link 204 and enters the maintenance port 9. At the same time, the swing link 201 is rotated around the pivotal axis of the rail carriage 202. The main body of the rail carriage 202 is not moved with respect to the fixed guide 207. However, its driving means for the first slide link 203 is being operated.

As a result, the links 101 of the rail 100 move forwardly from the first link 101a to the last link 101f in succession on the first slide link 203 with their joint rollers 103 received in the guide groove 209 formed in the upper surface of the first slide link 203.

After the first slide link 203 has been moved by a predetermined distance on the second slide link 204 as described above, the second slide link 204 is transferred by a predetermined distance on the fixed guide 207. The rail 100 leaves the rail housing 206, and all six joints 102 are arranged on the first and second slide links 203 and 204 in a linearly extended state in the lengthwise direction of both links 203 and 204. In this state, the rail carriage 202 is arranged to the proximal end of the second slide link 204.

Figure 7:
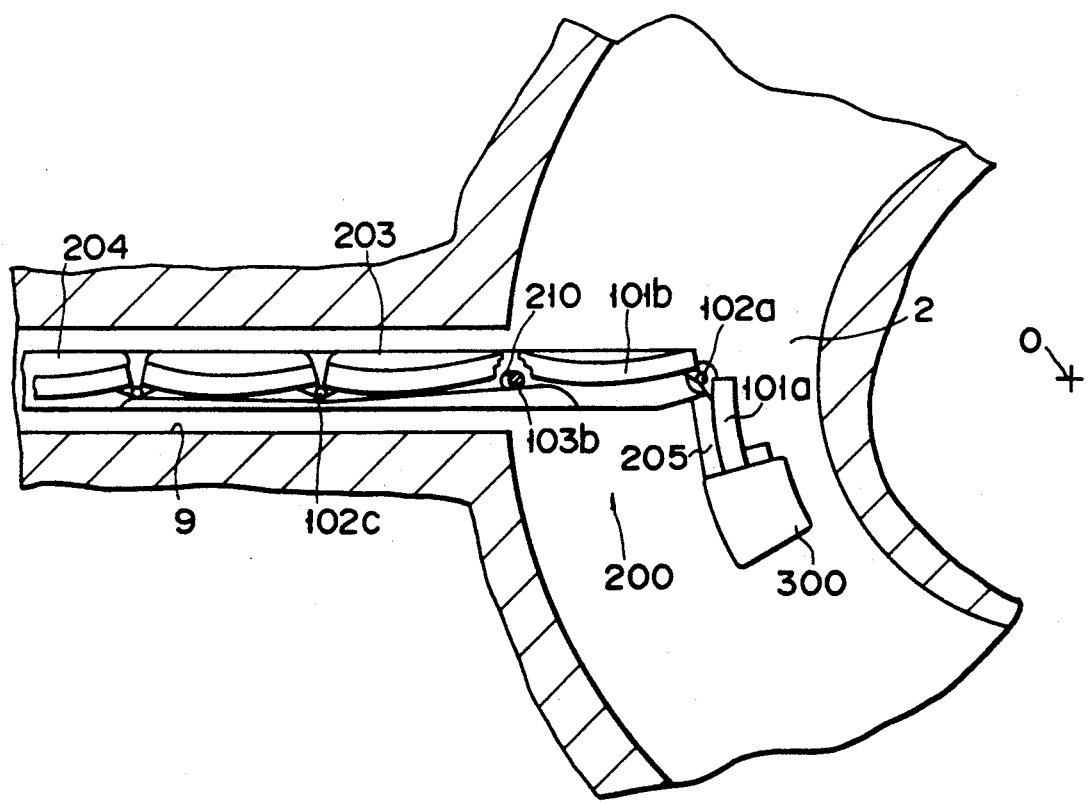
FIG. 7 is a schematic plan view showing the state in which an support arm and the first link are set in position in a torus space.

In the next step, the driving mechanism of the rail carriage 202 for rotating the swing link 201 is stopped, and the second slide link 204 and the rail carriage 202 are simultaneously moved on the fixed guide 207. Then, the vehicle 300 at the distal end of the rail 100 enters the torus space 2. The movement of the second slide link 204 and the rotation of the support arm 205 which are effected in synchronism with each other at predetermined speeds are adjusted so as to avoid the interference of the vehicle 300 and the support arm 205 with the inner wall of the torus space 2. When the center of the arcuated first link 101a substantially coincides with the center O of the torus space 2, the vehicle 300 and the support arm 205 are stopped operating, as shown in FIG. 7.

As described above, the substantial coincidence of the pivotal axis of the support arm 205 with the rotating axis of the joint of 102a of the first link 101a allows the link 101a to be rotated in accordance with the rotation of the support arm 205.

3. The step in which the rail is moved in the torus space

Figure 8:
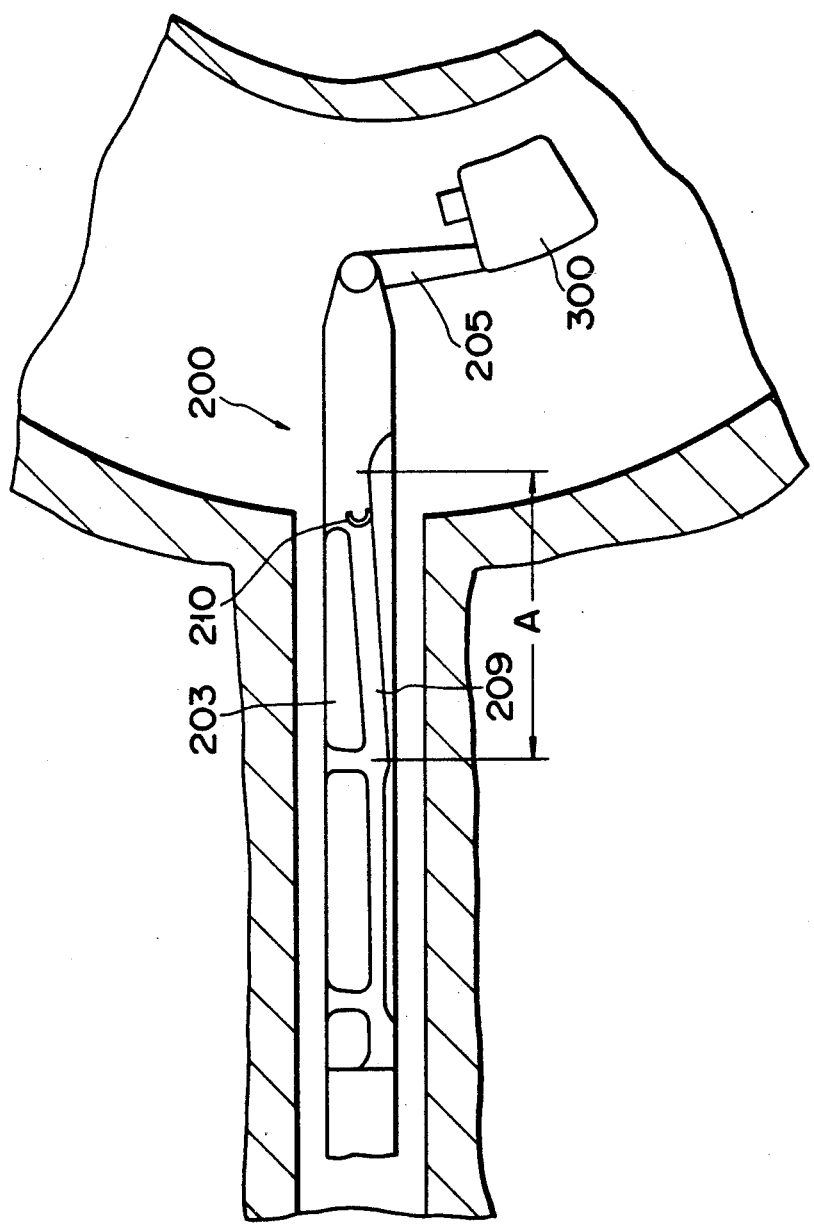
FIG. 8 is a schematic plan view of a link roller holder mounted on the first slide link.

Referring to FIG. 8, slidably driving the joint rollers 103 (FIG. 3) in the guide groove 209 will now be explained. FIG. 8 is shown the rail mounting device 200 with the rail 100 removed as shown in FIG. 7. A joint roller holder 210 having a crescent cross section can be moved in the guide groove 209 so that its lateral and vertical movements with respect to the guide groove 209 are restricted. The joint roller guide 210 is moved in the guide groove 209 at a predetermined stroke A by means of a linear guide (not shown) and driving means (not shown) and rotated in the guide groove 209 by means of its rotatable hold means (not shown) and its driving means (not shown).

The extending operation of the rail 100 in the torus space 2 by means of the joint roller holder 210 will now be explained with reference to FIGS. 7 to 11.

In the state as shown in FIG. 7, the joint roller holder 210 holds the joint roller 103b provided on the lower portion of the joint 102b with depressed inner surface of the joint roller holder facing the center of the torus space 2. As described above, the vehicle 300 is fixed to the support arm 205. In this state, by operating the driving means of the vehicle 300, the link 101a is extended from the distal end of the vehicle 300, while moving the joint roller holder 210 toward the center of the torus space 2 by the predetermined distance. At the same time, the rail carriage 202 at the proximal end of the rail 100 is caused to slide along the second slide link 204 by the same distance as the joint roller holder 210. In consequence, the whole rail 100 on the first and second slide links is moved toward the center of the torus space 2 and is stopped when the joint 102a arrives at the proximal end of the vehicle 300.

The joint roller holder 210 is slightly displaced toward the cask 8. After being separated from the joint roller 103b, the joint roller holder 210 is rotated through 180° so as to direct its depressed inner face toward the cask 8 and then receives the joint roller 103c provided on the next joint 102c.

Figure 9:
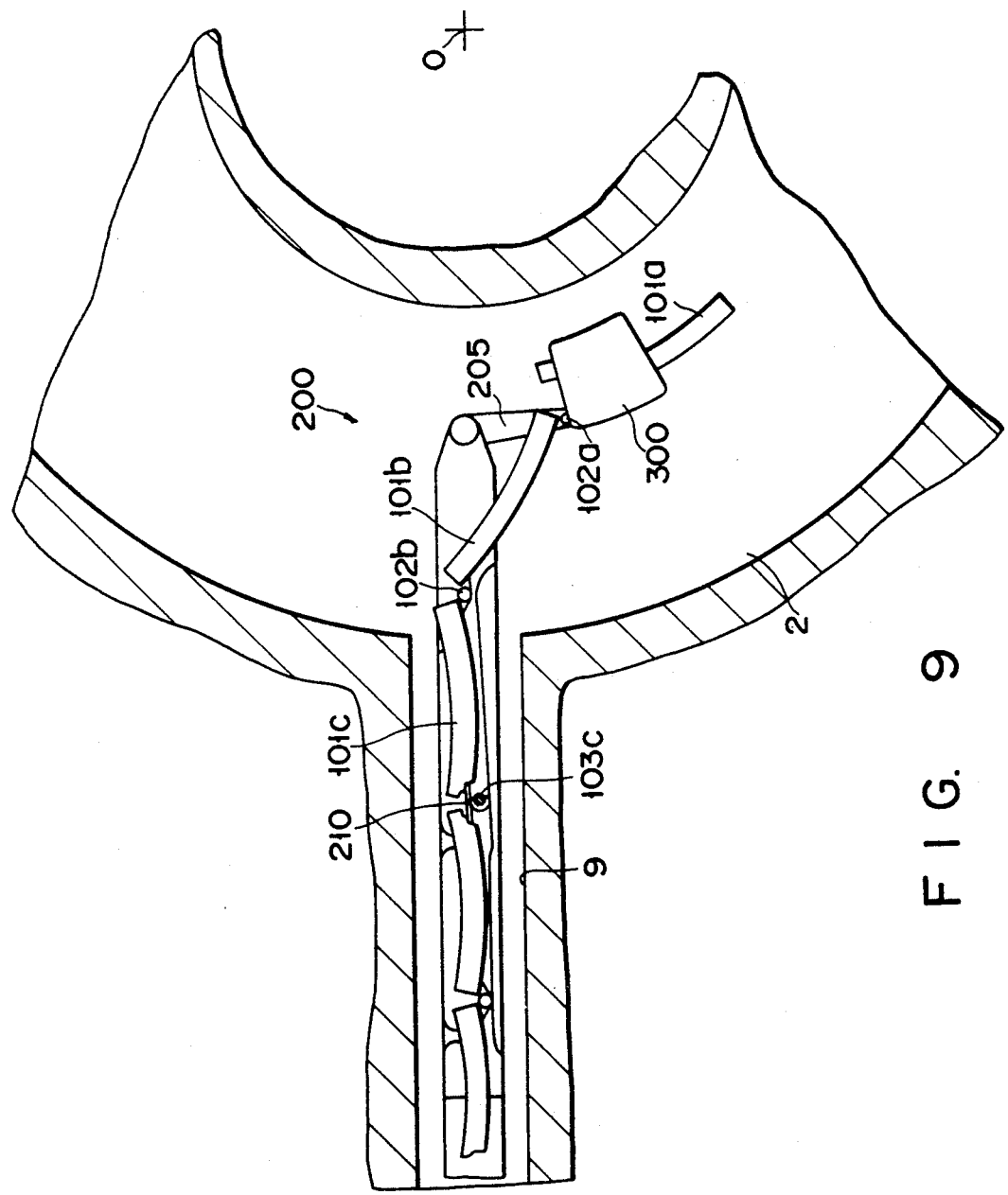
FIGS. 9, 10, 11 and 13 show the steps of extending the rail of this embodiment.

As shown in FIG. 9, the joint roller holder 210 with the joint roller 103c held therein is rotated so that the depressed inner face is directed toward the center of the torus space 2 again.

Figure 10:
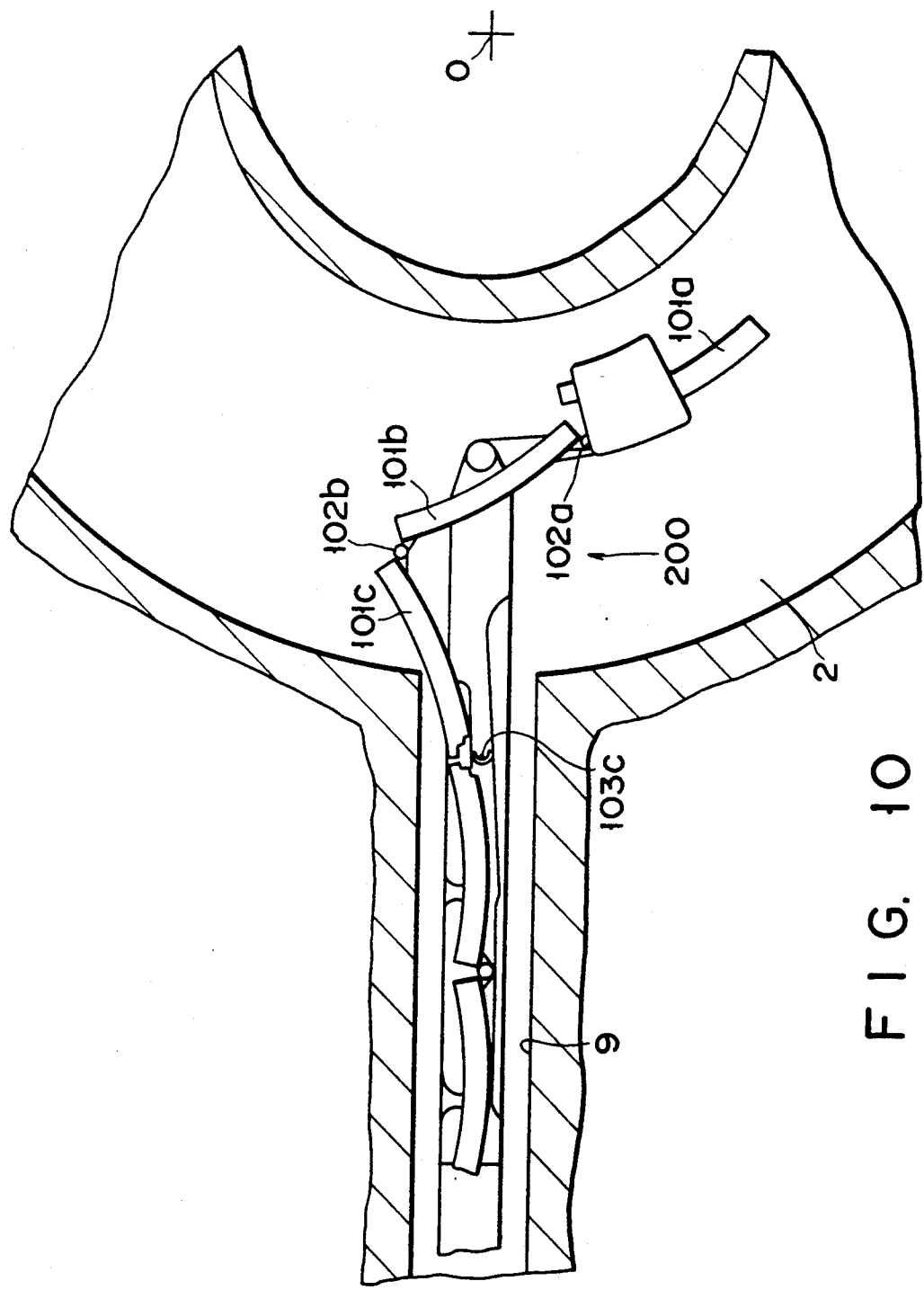
Figure 11:
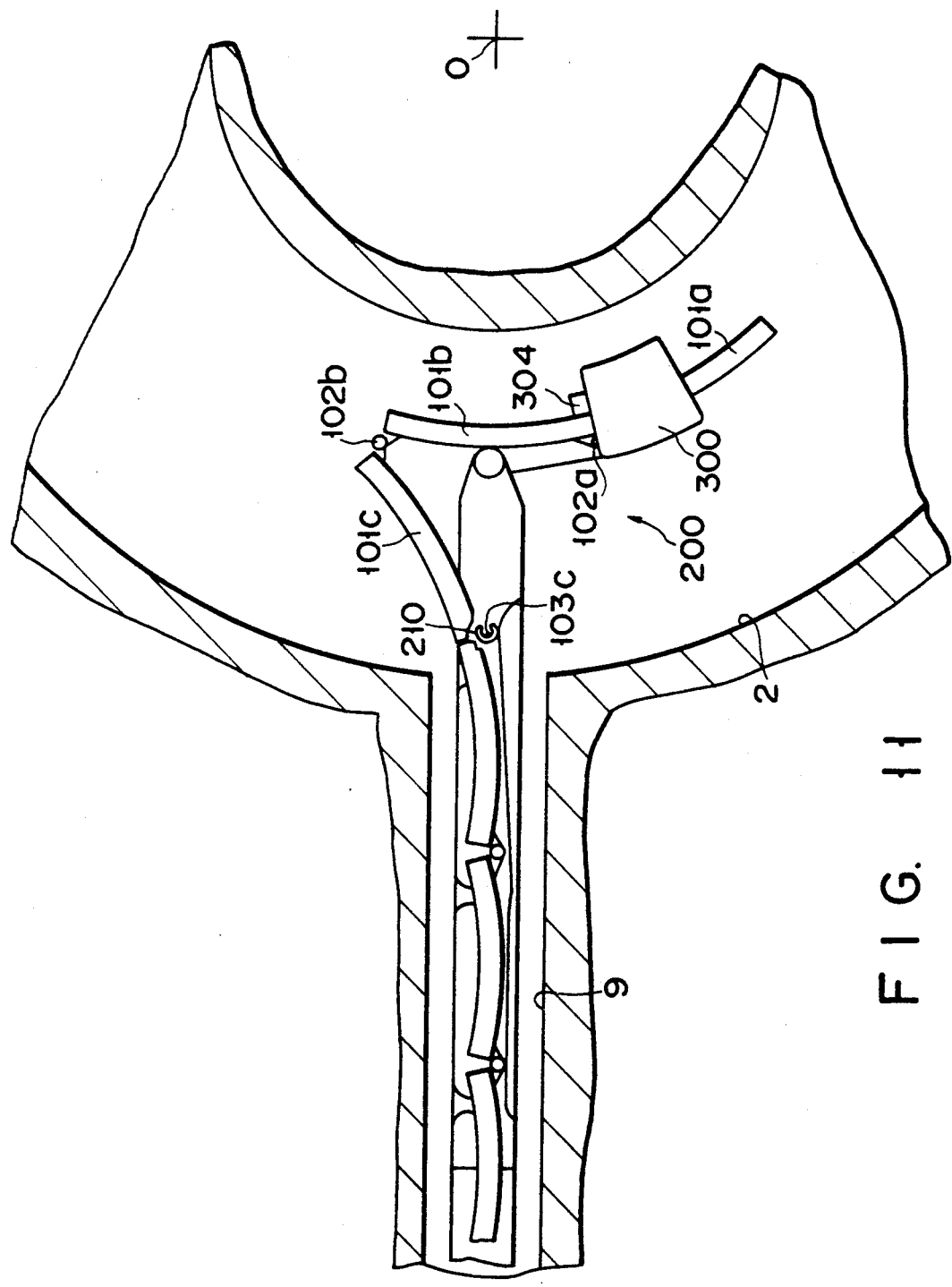

In the next step, the driving means of the vehicle 300 remains stationary. The joint roller holder 210 is caused to slide toward the center of the torus space 2 and the rail carriage 202 is also caused to slide along the second slide link 204 by the same distance as the joint roller holder 210 at the same time. The overall rail 100 is moved toward the center of the torus space 2 and the link 101b is rotated around the joint 102a from a transient state as shown in FIG. 10 to the final state as shown in FIG. 11 in which the links 101a and 101b cooperate to assume a continuous arc having a center of curvature substantially coincident with the center O of the torus space 2.

Figure 12:
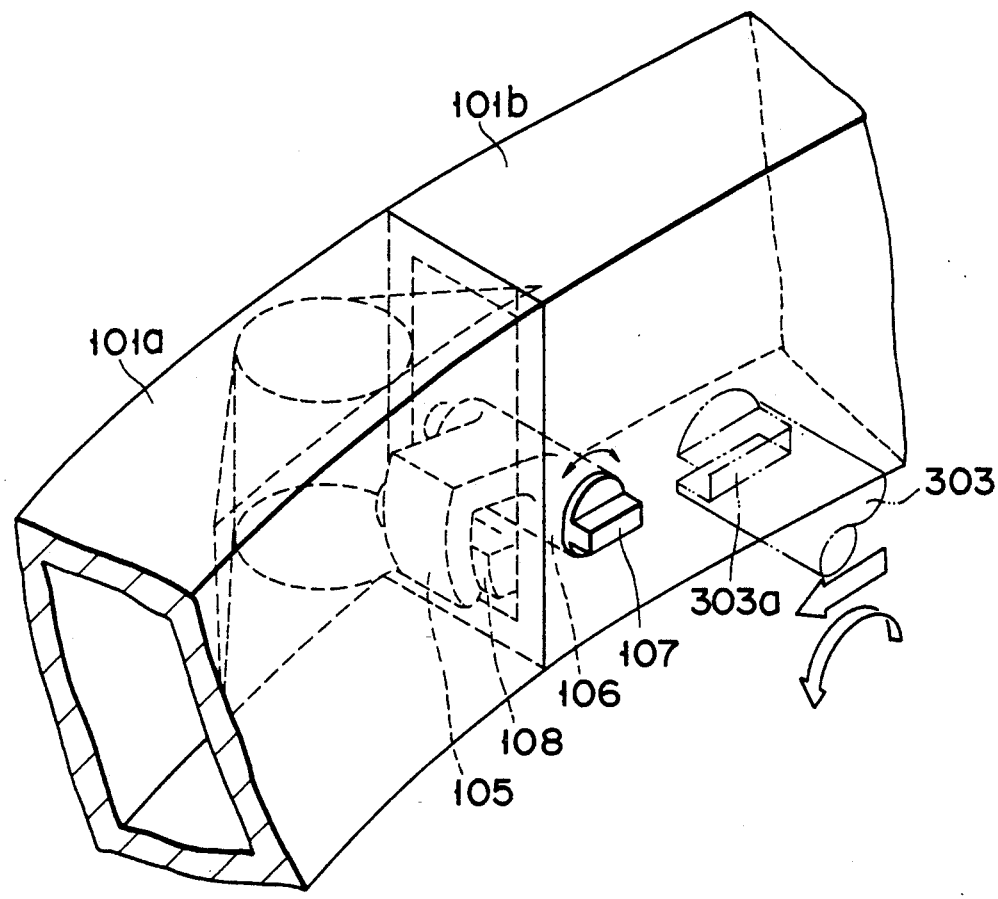
FIG. 12 is a perspective view of a joint locking mechanism and its driving mechanism of this embodiment.

Referring to FIG. 12, the explanation will now be made to the way for locking the joint and its operation.

As shown in FIG. 12, a hook 105 is housed in an end of the right side link 101 which is adjacent to the left side link 101. A support shaft 106 with the hook 105 is rotatably supported so as to be directed radially of the arcuated link 101. A narrow rectangular projection 107 is formed on the end of the support shaft 106 which is at the inner side of the link 101 so that it diametrically crosses the end. The projection 107 is directed in the circumferential direction when the hook 105 engages with and disengages from a pin 108 housed in the left side link 101 adjacent to the right side link 101.

Referring to FIG. 12 again, an operation member 303 having a narrow rectangular groove 303a diametrically formed therein is rotatably supported by the proximal end of the vehicle 300. The groove 303a is designed to engage with the projection 107, when the link 101 is at a position as shown in FIG. 11. As shown in FIG. 11, a driving mechanism 304 for the operation member 303 is provided on the proximal end of the vehicle 303.

In the state as shown in FIG. 11, therefore, the links 101a and 101b are firmly connected to each other by rotating the operation member 303 though 180° for allowing the groove 303a to be rotated through the same angle and engaging the hook 105 with the pin 108 so that both links do not rotate with respect to each other.

Figure 13:
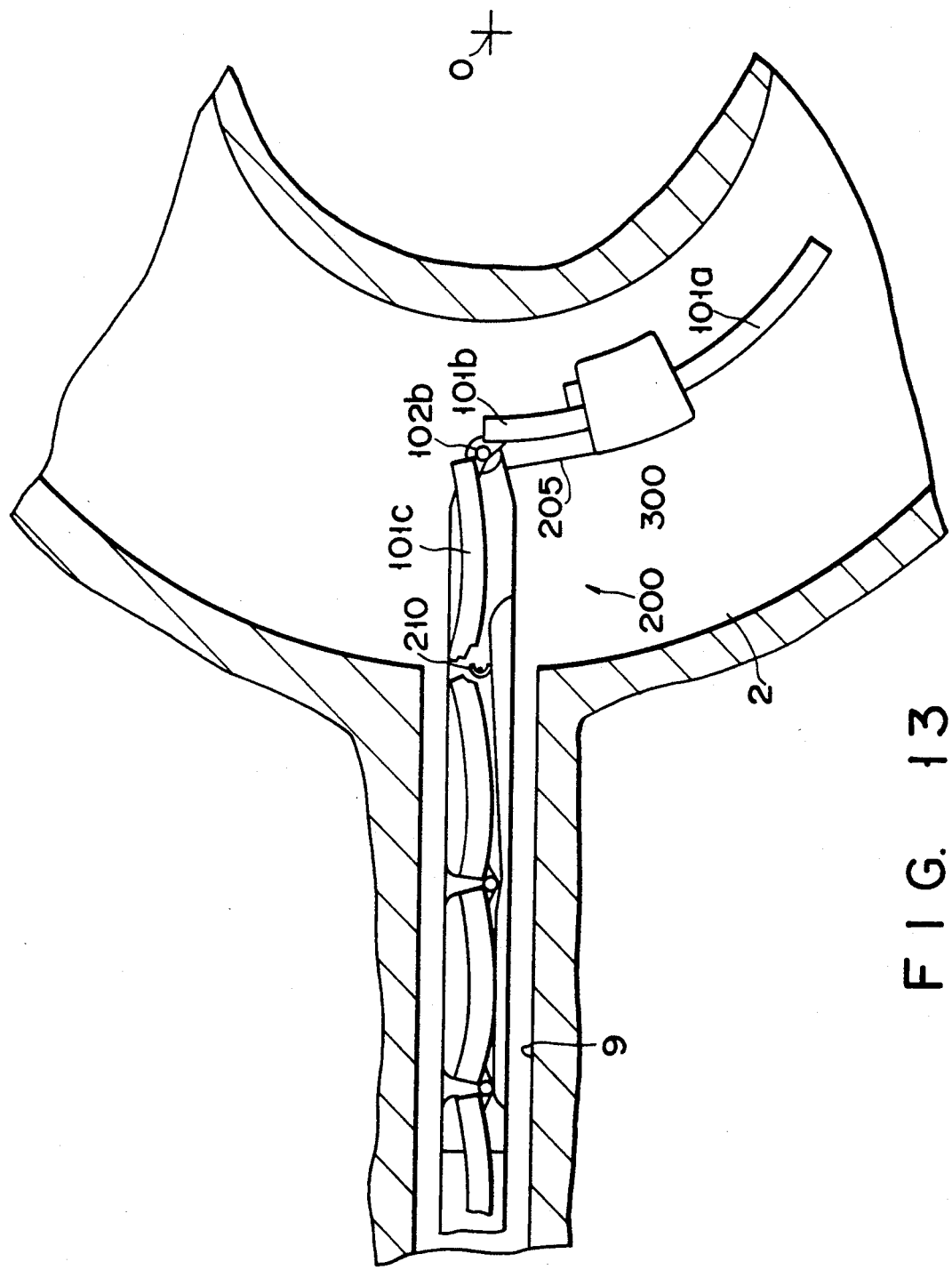

In the next step, the joint roller holder 210 is rotated through 180° to allow its depressed inner face to be directed toward the cask 8 and the link 101a is further extended toward distal end thereof by the driving means of the vehicle 300. At the same time, the joint roller holder 210 and the rail carriage 202 are moved toward the cask 8 by a the same predetermined distance. When the joint 102b arrives at the rotating axis of the support arm 205, the joint roller holder 210 is rotated through 180° to take the position as shown in FIG. 13 in which the first link 101a projects from the vehicle 300 as compared with FIG. 7.

The above-mentioned operation is repeated until the rail 100 in the maintenance port 9 is extended in a continuous arc shape in a locked state in the torus space 2.

4. The step in which the rail is supported by the rail supporting device after being extended in the tours space In FIG. 1 (as already mentioned), is shown the state in which the extended rail 100 is supported by the rail supporting device 250.

Figure 14:
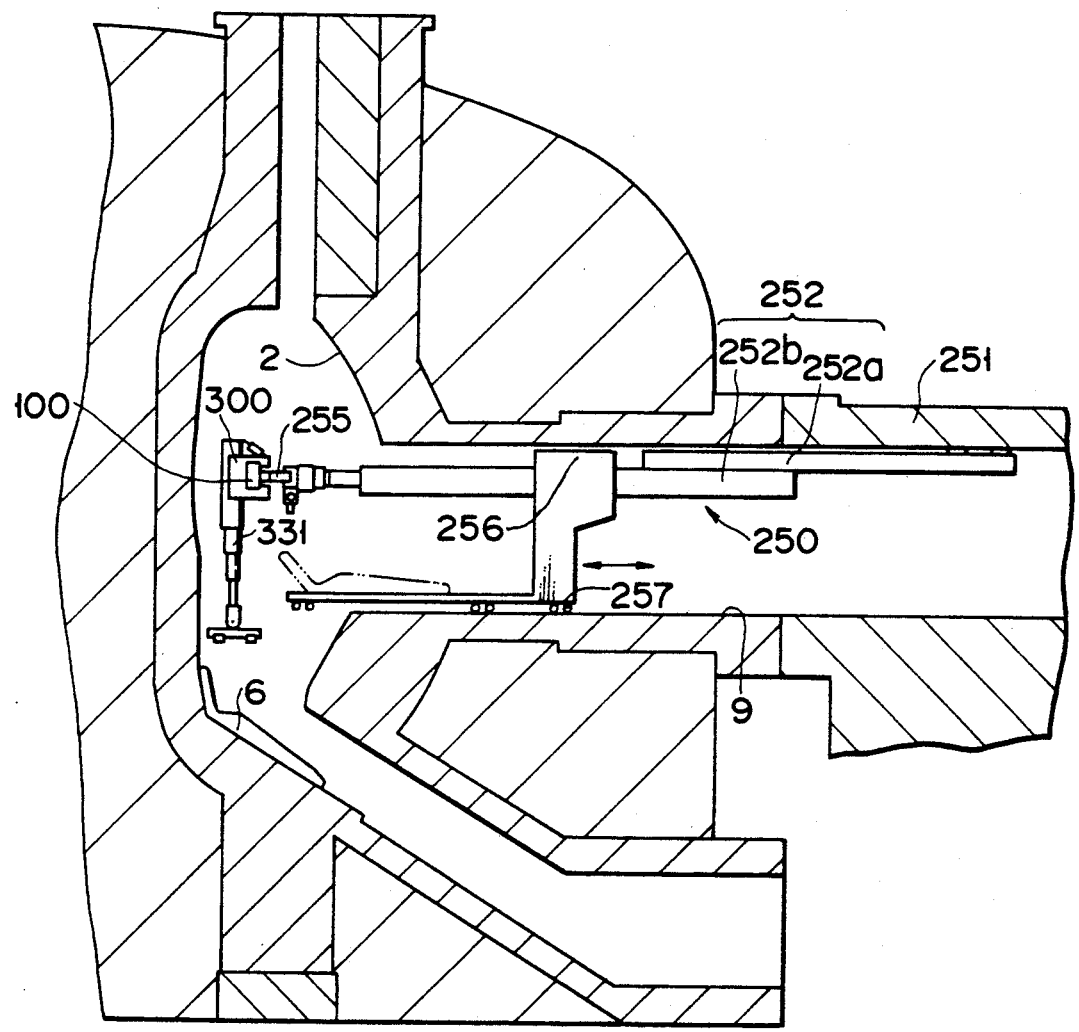
FIG. 14 is a side view of a rail supporting device of this embodiment.
Figure 15:
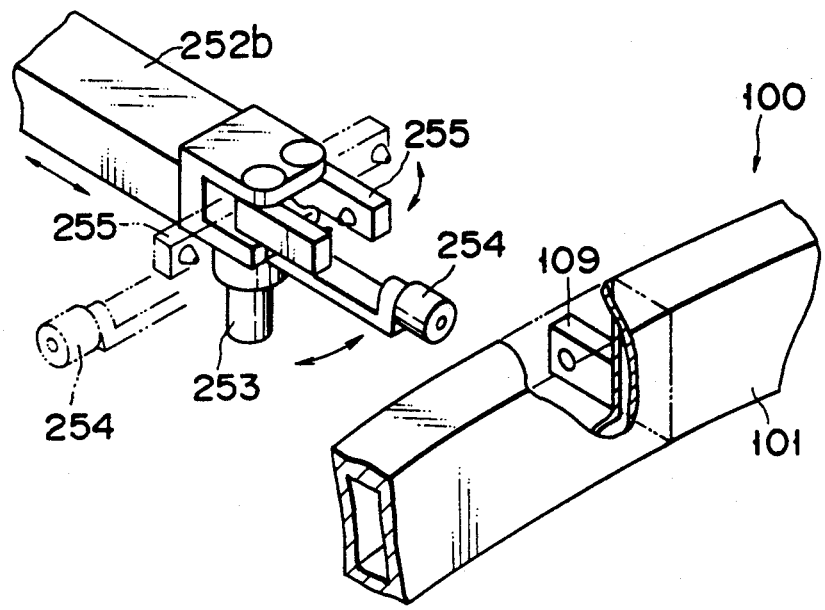
FIG. 15 is a perspective view of the detail of the distal end portion of the rail supporting device.

As shown in FIGS. 14 and 15, the rail supporting device 250 comprises a base 251 located externally of the reactor, a side link assembly 252 slidable in two steps by comprising a first slide link 252a slidable along the base 251 in the radial directions of the torus space 2 and a second slide link 252b slidable along the first slide link 252a, a driving mechanism (not shown), a guide roller 254 provided on the distal end of the second slide link 252b and swingable by means of a driving device 253 between a position close to the rail 100 and a position remote therefrom, a rail clamping mechanism 255 opened and closed by mean of a driving mechanism (not shown), and an in-vessel component transporting mechanism 256 movable along the directions in which the slide link assembly 252 is extended and shrunk.

When the rail 100 is extended in the torus space 2 according to the above-mentioned steps, the slide link assembly 252 of the rail supporting device 250 is introduced through the adjacent maintenance port 9 into the torus space 2 and its distal end is set in position in the torus space 2. During the extension of the rail 100, the guide roller 254 is abutted against the undersurface of the rail 100. After the extension, the rail clamping mechanism 255 is arcuated by the driving mechanism (not shown) to hold the projection 109 (FIG. 15) formed between the adjacent joints on the outer peripheral surface of the rail 100. Next, the guide roller 254 can be swung by means of the driving device 253 to such a position shown by phontom lines in FIG. 15 so that the guide roller 254 does not hinder the running of the vehicle 300.

Figure 16:
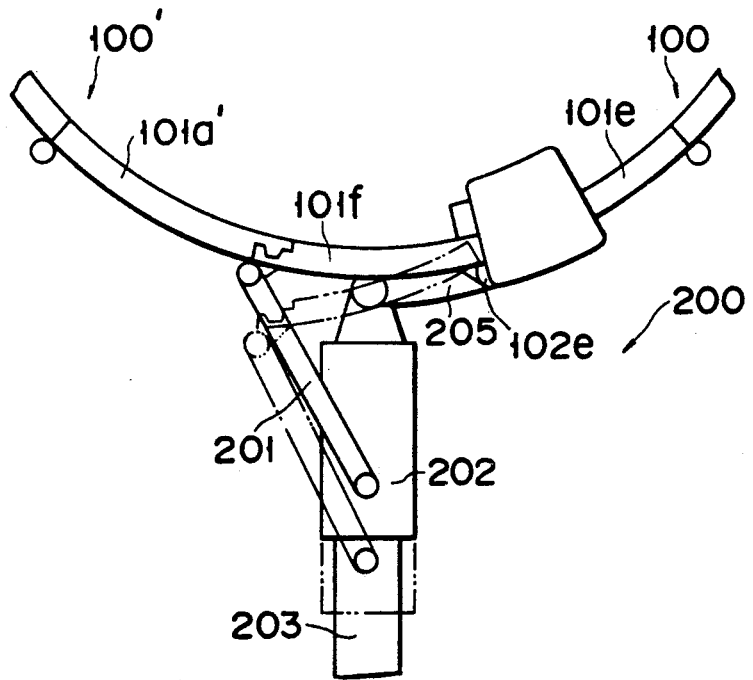
FIG. 16 is a plan view of a mechanism for fixing the distal end of the rail in the opposed port.

Referring to FIG. 16, the fixing of the distal ends of a pair of rails will now be explained.

The rail mounting assembly comprises a first rail mounting device 200 having the same structure as mentioned above and a second rail mounting device 200 and introduced into the torus space 2 through another maintenance port 9 which is oppositely aligned with the maintenance port 9 (FIG. 1) through which the first rail mounting device 200 passes. The first link 101a of the rail 100 extended by the first rail mounting device 200 is fixed by the second rail mounting device 200, and the first link 101a' of the rail 100' extended by the second rail mounting device 200 is likewise fixed by the first mounting device 200.

In other words, by rotating the link 101f around the joint 102e and moving the rail carriage 202 forwardly, a rail holding device (not shown) provided on the distal end of the swing link 201 of the first rail mounting device 200 is moved to the facing distal end of the first link 101a' of the rail 100' to fixedly hold it. Thereafter, the joint 102e is locked to the vehicle 300. Likewise, a rail holding device (not shown) of the second rail mounting device 200 fixedly holds the distal end of the first link 101a of the rail 100, and the corresponding joint is also locked to the vehicle 300. In this way, the rails 100 and 100' are firmly supported at four points and form a circular track for the vehicle 300.

Where, on the other hand, only one rail mounting device 200 is used to extend the rail 100 over half the circumferential length (FIG. 1), two rail supporting devices 250 are introduced through a maintenance port 9 oppositely disposed to the rail mounting device 200 and another maintenance port 9 facing the side of the rail 100 so that they hold the first link and a middle link, respectively to ensure a rigid supporting of the rail 100 at three points. The rail 100 is extended in the torus space 2 and is held in a stable state.

It is noted that the rail 100, in FIG. 1, is supported by the rail supporting device 250 inserted through the maintenance port 9 adjacent to the rail mounting device 200 but another maintenance port 9 through which another rail supporting device passes is omitted from the figure for simplicity.

5. The step in which the diverter is exchanged

Figure 17:
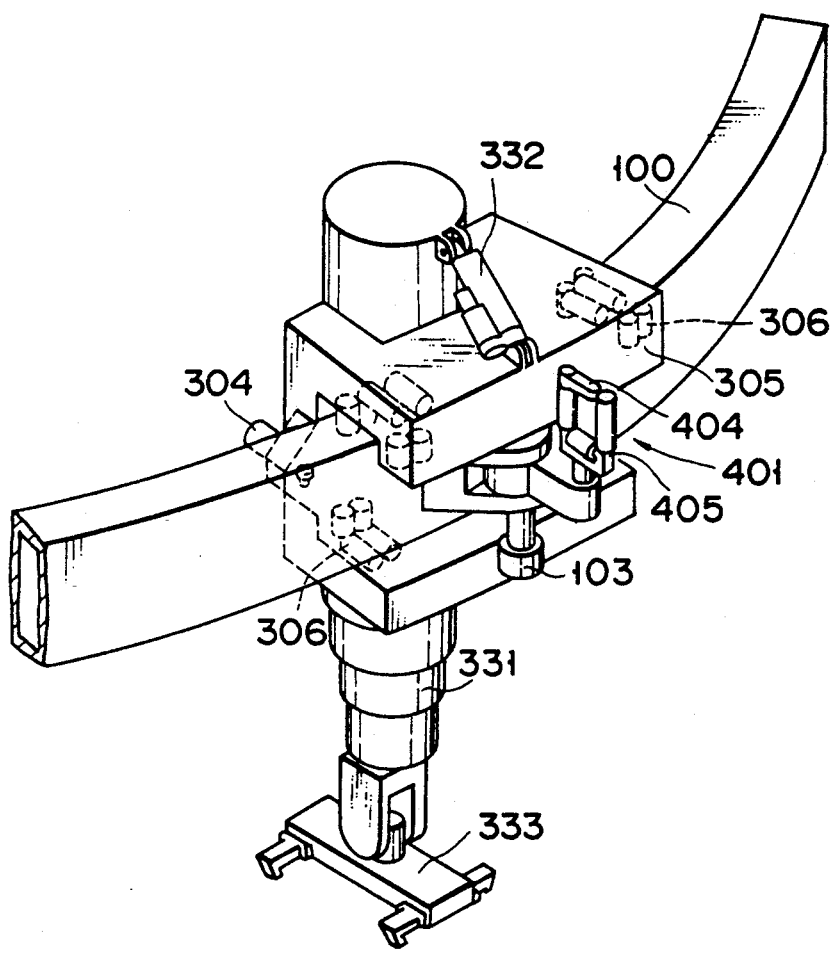
FIG. 17 is a perspective view of the detail of the vehicle.

As described above, the vehicle 300 has the pinion 301 engaging the rack 104 provided on the lateral side of the rail 100 and its driving mechanism 302 (FIG. 4). As shown in FIG. 17, the vehicle 300 is further provided with a manipulator 330 having a telescopic arm 331 swingable by means of a extensible and shrinkable actuator 332 in a plane perpendicular to the rail 100 and its driving mechanism, and the driving mechanism 304 for operating the locking mechanism of the rail 100.

A plurality of wheels 306 are pivoted to inner surfaces of the channeled frame 305 of the vehicle 300 in such a manner that the horizontal groups of the wheels 306 rotatably contact the upper and undersurface of the rail 100, respectively, and the vertical groups thereof rotatably contact the inner and outer lateral sides of the rail 100, respectively, so that the joints 102 of the rail 100 can pass the channeled portion of the vehicle 300. As described above, the pinion 301 engaging with the rack 104 formed on the inner wall of each link 101 of the rail 100 (see FIG. 4) is driven by means of the driving mechanism 302. The telescopic arm 331 mounted on the frame 305 at its inner side of the torus space 2 is provided at its distal end with an end effecter 333 extensible and shrinkable by a driving mechanism (not shown) and having the freedom of swing, rotation and holding for handling the in-vessel components. The driving mechanism 304 for the locking mechanism of the joint 102 is provided on the proximal end of the frame 305.

On the undersurface of the vehicle 300 is formed the projection for the vehicle holding mechanism provided on the support arm 205.

The exchange of the diverter plate which is one of the in-vessel components will now be explained with reference to FIG. 18.

After the extension and fixing of the rail 100 in the torus space 2 according to the steps (1) to (4), the vehicle holding mechanism of the support arm 205 is released. The vehicle 300 is moved along the rail 100 by driving the pinion 301. Upon arriving at the position above the diverter plate 6 to be exchanged, the vehicle 300 is stopped. As shown in FIG. 18, the telescopic arm 331 is extended or shrunk and swung and the end effecter 333 is set in position for holding the diverter plate in accordance with the freedom of the end effecter itself.

Figure 18:
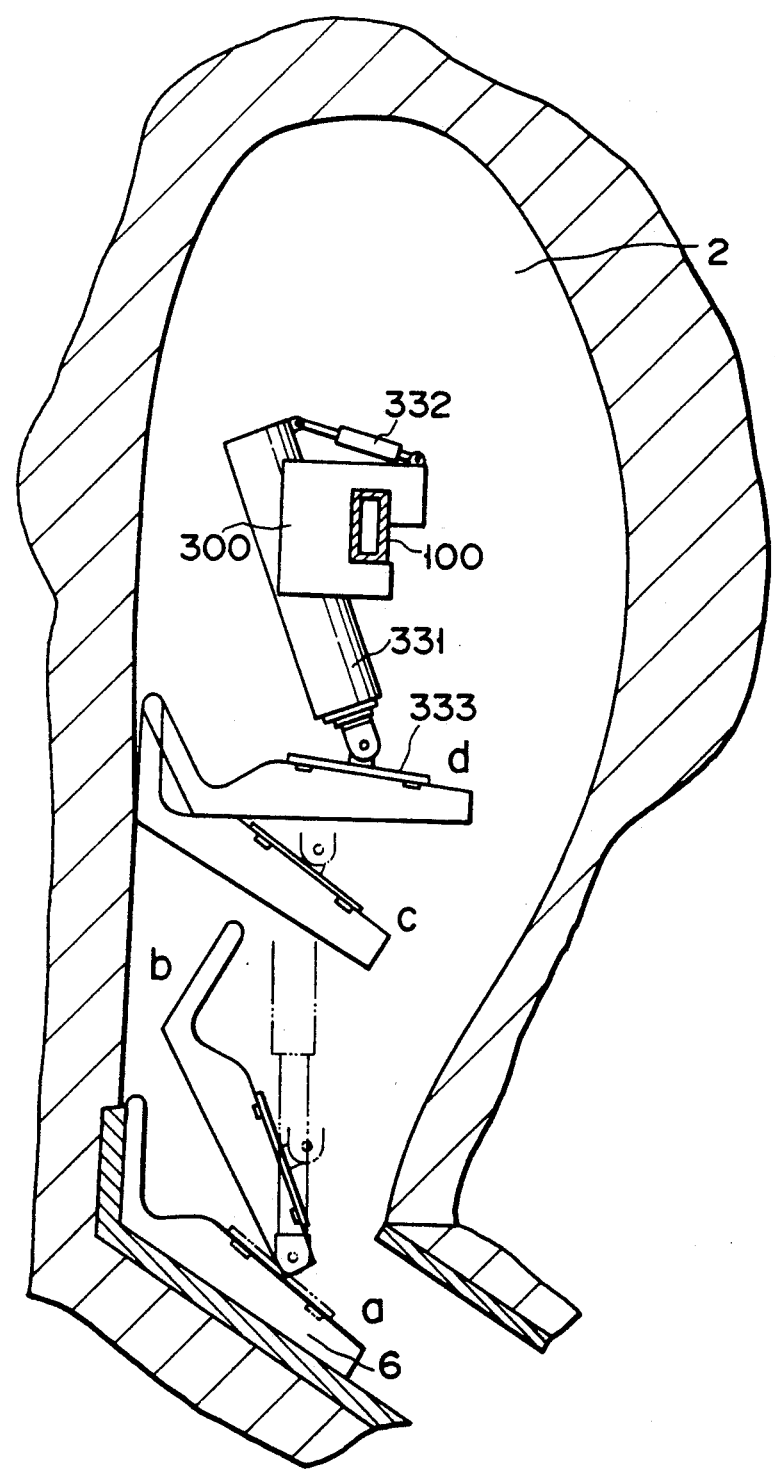
FIG. 18 is a side view of a diverter plate showing how to exchange the same in this embodiment.

The end effecter 333 is actuated to hold the diverter plate 6 so that the end effecter 333 lifts the diverter plate 6 according to the steps shown by a, b and c in FIG. 18. The vehicle 300 is further moved until it reaches the position in front of the maintenance port 9 in which the rail supporting device 250 is inserted, as shown in FIG. 14. The telescopic arm 331 is shrunk and swung to lift the diverter plate 6 to the position d in FIG. 18. Thereafter, the in-vessel transporting mechanism 256 is sent into the torus space 2 from the maintenance port 9. The in-vessel transporting mechanism 256 comprises a carriage supported by a plurality of the rollers 257 forming a bogie structure and a driving mechanism (not shown). When the mechanism 257 is advanced, the carriage arrives at the position right under the rail 100 to transport an invessel component between the carriage and the vehicle 300. In the present case, the carriage receives the diverter plate 6 from the vehicle 300 and is retracted to transport the diverter plate 6 in a maintenance cask (not shown). When the step is reversed, a new diverter plate 6 can, of course, be mounted in the vessel of the torus space 2.

6. In the step in which the extended overall rail is restored in the cask

The rail mounting device extended in the maintenance port or the reactor is restored in the cask substantially in reverse steps to those of the extension. The steps will now be explained. It is noted that the rail extended from another maintenance port is similarly restored in the corresponding cask.

(i) The vehicle 300 is returned to the position at which the support arm 205 is disposed and is fixed thereto by the vehicle holding mechanism. In this case, the manipulator 330 is shrunk to take a predetermined posture a shown in FIG. 16.

(ii) The guide roller 254 of the rail supporting device 250 is advanced to support the rail 100, and the projection 109 formed on the outer periphery of the railis released as shown in FIG. 15.

(iii) The joint 102e of the last link 101f is unlocked as shown in FIG. 16.

(iv) The first links 101a and 101a' of the first and second rail mounting devices transferred from the opposing maintenance ports are released as shown in FIG. 16.

(v) As the rail carriage 202 is toward the cask 8, the swing link 201 is rotated through a predetermined angle so that the last link 101f of the rail 100 is rotated through a predetermined angle as shown by the phantom lines in FIG. 16.

(vi) By means of the driving mechanism of the vehicle 300, the next link 101 is pulled in at the position at which the next joint 102 is released. In synchronism therewith, the rail carriage 202 is moved as shown in FIG. 13.

(vii) The joint 102 of the rail 100 is unlocked as shown in FIG. 12.

(viii) As the rail carriage 202 is moved toward the cask 8, the joint roller holder 210 is actuated to rotate the link of the unlocked joint through a predetermined angle as shown in FIG. 11.

(ix) The rail is pulled in by means of the vehicle 300 at the position at which the next joint 102 is unlocked. In synchronism therewith, the rail carriage 202 and the joint roller holder 210 are moved in a predetermined manner as shown in FIGS. 9 and 10.

(x) The steps (viii) and (ix) is repeated so that the links 102 are linearly arranged in the maintenance port 9 as shown in FIG. 7.

(xi) As the second slide link 204 is retracted, the support arm 205 is rotated through a predetermined angle so that the vehicle 300 enters the maintenance port.

(xii) The second slide link 204 and the rail carriage 202 are returned to the places where they were housed in the casks 8 and the last link 101f is moved along the rail housing guide 206 to be housed therein as shown in FIG. 6.

(xiii) As the first slide link 203 is retracted, the swing link 201 is swung through a predetermined angle to house the rail 100, the first slide link 203 and the vehicle 300 in the cask as shown in FIG. 2.

To perform synchronous operation of a plurality of driving mechanisms as described above, the servo motors of the driving mechanisms are generally controlled so that their rotational angles are set to predetermined values as time passes. However, due to backlash, bending, variation of dimension, variation of frictions and the like of elements to be controlled, their real positions are likely to be displaced from the positions to be set. Such displacement increases positional deviation in the position control loop and generates restoring forces to the positions to be set. When the arcuated links are moved into the torus space 2 or the like, the directions in which they are restricted differ. As the links are displaced from the position to be set, frictions are increased on the restricted portions. Strong restoring forces exerted on those portions further enhance the frictions, and so-called wedge effect is likely to occur to stick the links or exert excessive stresses thereon. When the rail 100 is displaced from the position to be set at the time of its holding and fixture, a reaction is applied to the rail 100 and an excessive strain is likely to generate therein.

With the remote control maintenance apparatus of this invention is provided with a highly reliable control system in which the apparatus is not stuck or exerted by an excessive stress when the real position and the set position of the apparatus differ from each other.

Figure 19:
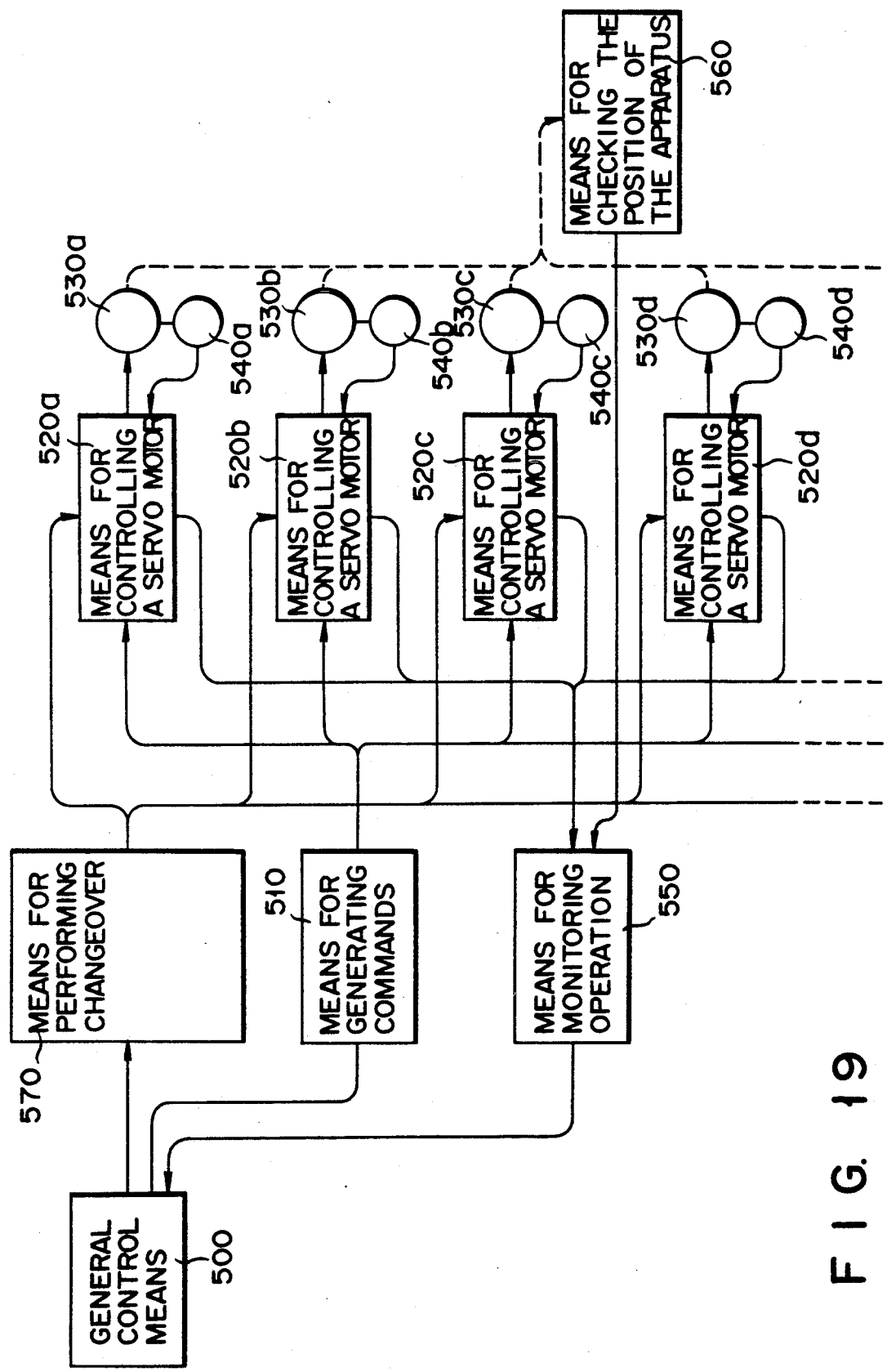
FIG. 19 is a block diagram of the embodiment of the remote control maintenance apparatus of FIG. 1.

FIG. 19 shows a block diagram for an embodiment of the whole system for controlling the remote control maintenance apparatus. General control means 500 instructs the extension and housing of the rail 100, the operation of the manipulator 330 and the like in each sequence. Means 510 for generating commands sets the command values of the positions and the driving forces of the driving axes according to the instructions of the general control means 500 in order to realize the predetermined operation of the apparatus. Means 510a, 510b, 510c, 510d and so on for controlling servo motors control respective servo motors 530a, 530b, 530c, 530d and so on according to the command values, feedback signals of means 540a, 540b, 540c and 540d and so on for checking rotational angles which means are mounted on the respective servo motors, and signals for checking the driving forces.

Means 550 for monitoring operation receives data of the rotational angles and speeds of the servo motors 530a, 530b . . . /picked up by the servo motor controlling means 520a, 520b, 520c, 520d and so on. The means 550 judges whether the servo motors operate normally and sends the results to the general control means 500. Means 560 for checking the position of the apparatus carries out the checking of the relative positions of the elements to be controlled when the mechanisms in the remote control maintenance apparatus cooperate with each other, and the means 560 sends the checked signals to the operation monitoring means 550.

Means 570 for performing changeover after performing control (hereinafter referred to as the performing changeover means 570") selects one of the controls which have already prepared and are used in the servo motor control means 520a, 520b . . . . The controls relate to the positions controlled at a high rigidity, the positions controlled at a low rigidity, forces, torques, servo-off, brake-on and the like. When the element to be controlled is displaced after it has been set at position, the restoring force is exerted thereto by the corresponding servo motor. The position control at a high rigidity is defined as a position control made by a high restoring force, that is, the position control made at a high servo rigidity. On the other hand, the position control at a low rigidity means the position control made by a low restoring force.

The operation of the remote control maintenance apparatus will now be explained with reference to FIGS. 7, 9 to 11, 13, 15, 16, 18 and 19.

(i) The operation for transferring the arcuated links constituting the rail into the torus space A servo motor 530m of the driving means of the vehicle 300, a servo motor 530rh for driving the slide of the joint roller holder 210 and a servo motor 530rc of the rail carriage 202 are position-controlled by corresponding servo motor controlling means 520m, 520rh and 520rc and synchronously driven.

When, for example, the arcuated links are excessively fed by the vehicle 300 in the circumferential direction of the rail 100 due to the manufacturing tolerances and the displacement of the positions of the elements of the rails, contacting force between the joint rollers 103 on the lower ends of the corresponding joints 102 and the side walls of the guide groove in the upper surface of the slide link 203 is increased and the driving force for feeding the rail by means of the vehicle 300 is also enhanced. As a result, the friction between the joint rollers 103 and the side walls of the guide groove is increased so that the arcuated links 101 are not moved smoothly. The servo motor controlling means 520m for controlling the rail feeding movement of the vehicle 300 detects that the driving force exceeds a predetermined value, the positional displacement is increased and the speed is reduced, and the general control means 500 receives signal indicating that the arcuated links 101 do not move smoothly. The general control means 500 produced the increased command values of movement of the joint roller holder 210 and rail carriage 202 by a proper values through the command generating means 510 or moves back the rail carriage 202 by a proper value also through the command generating means 510, whereby making the movement of the arcuated links 101 normal.

FIG. 9 shows the next step of the extension of the rail 100. While the driving means for the vehicle 300 is stopped, the joint roller holder 210 is made slide toward the center of the torus space 2, and at the same time, the rail carriage 202 is caused to slide along the second slide link 204 by the same distance as the joint roller holder 210. All actuated links 101 on the first and second slide links 203 and 204 are moved toward the center of the torus space 2, the link 101b rotates about the joint 102a to take the transient state as shown in FIG. 10 and the final state as shown in FIG. 11. The links 101a and 101b assume a continuous arc having a center substantially consistent with the center of the torus space 2. In this step, the joint roller holder 210 and the rail carriage 202 are controlled until they arrive at the positions near their positions shown in FIG. 11. The positional information at these positions is transmitted to the general control means 500 through the operation monitoring means 550. The general control means 500 changes the control mode of the servo motor control means 520rh and 520rc of the joint roller holder 210 and the rail carriage 202 through the performing changeover means 570 and the means 500 drives them by keeping the driving forces lower than predetermined values. After then, the operation monitoring means 550 detects that the speeds of the elements to be controlled are rapidly reduced and the driving forces thereof are increased to assume the state as shown in FIG. 11. When this occurs, the general control means 500 stops the movement of the elements to be controlled. Since this control allows the arcuated link 101b to reach the state accurately as shown in FIG. 11 even if there are dimensional errors in the elements and the positional displacement and the run-over of the elements is not forcibly controlled, excessive forces are not applied to the vehicle 300 supporting the arcuated link 101a and the like. After the joint 102a of the arcuated link 101 has been locked, the arcuated link 101b is fed and the rail carriage 202 is moved toward the cask 8 in a synchronous manner. When the driving force of the rail carriage 202 is controlled in accordance with a predetermined value and the position control at a low rigidity is carried out in this state, the joint 102b arrives at the rotating axis of the support arm 205 to assume the state as shown in FIG. 13. This control prevents the rail carriage 202 from pulling the arcuated links 101 toward the cask 8 by an excessive force even if there are dimensional errors in the elements and positional displacement.

(ii) The operation for extending the last arcuated link in the torus space

The explanation will now be made to the extension of the last arcuated link 101f which takes place around the joint 102e (full line in FIG. 16).

First, at the time when the swing link 201 begins to rotate from the state in which it is directed in the radial direction of the torus space 2 according to the rotation of the arcuated link 101f, as shown in FIG. 1, the positional control of the swing link 201 by means of the servo motor controlling means 520 through the performing changeover means 570 is stopped, making the servo control set free. Thereafter, the rail carriage 202 is advanced similarly in case in which the other arcuated links 101 were fed, and the joint 102e is similarly locked. Further, when two rails are used, the distal end of opposing semi-circularly arcuated rail 100' which was extended through opposing maintenance port 9 is fixed to the joint 102f. In this state, the swing link 201 is set free or is position-controlled at a low rigidity and the rail carriage 202 is also position-controlled at a low rigidity so that the reaction is reduced even if the positional displacement occurs at the time of fixing said another rail 100' to the joint 102f.

(iii) The operation for supporting the rail by means of the supporting device after the extension of the rail As shown in FIG. 15, the guide roller 254 contacts the undersurface of the rail 100 during the extension of the rail 100. After extension, the clamping mechanism 255 is operated by means of a driving mechanism (not shown) to hold the projection 109 formed between the links on the outer periphery of the rail. In this step, the swing link 201 and the rail carriage 202 are set free or are position-controlled at a low rigidity so as to reduce the reaction when the rail clamping mechanism 255 of the rail supporting device 250 is moved. The slide link 252 may be position-controlled at a low rigidity.

After the distal end of the rail 100 has been fixed and supported, the elements having a function for supporting the rail, such as the swing link 201, the rail carriage 202, the slide link 252 and the like are position-controlled at a high rigidity or locked by means of a brake, thereby ensuring the rigidity of the extended rail 100.

(iv) The operation for exchanging the diverter plate

After the extension of the rail 100 in the torus space 2, the vehicle holding mechanism of the support arm 205 is released, and the vehicle 300 is moved along the rail 100 by driving the driving mechanism of the vehicle 100. Upon reaching the position above the diverter plate 6 to be exchanged, the vehicle 100 is stopped. A telescopic arm 331 as shown in FIG. 18 is extendended or shrunk and swung. Due to the operation with a predetermined number of degrees of freedom, an end effecter 333 is set to the diverter plate holding position. In the next step, the end effecter 333 is operated to hold the diverter plate 6. The driving mechanism of the end effecter 333 having the above-mentioned degrees of freedom is position-controlled at a low rigidity to reduce the reaction due to the holding of the diverter plate 6. After the diverter plate 6 has been held and lifted, the position control is changed from the one having a low rigidity to the one having a high rigidity, whereby the diverter plate 6 is transported at a high mechanical stability. The replacement of the diverter plate 6 with a new one is effected under the position control at a low rigidity, reducing the reaction due to the mounting of the new diverter plate.

v) The operation of returning the vehicle to the position of the support arm

When the vehicle 300 is returned to the position at which the arm 205 is disposed after the vehicle 300 has driven along the extended rail 100 and the required operation of the rail has been finished, the rigidity of the position control for rotating the support arm 205 and driving the slide link 203 and the rail carriage 202 is lowered so that excessive forces do not applied to each other even if the positional displacement occurs between the rail and the support arm 205.

(vi) The operation for restoring the rail in the cask

The rail 100 extended in the torus space 2 is received in the cask 8 substantially in the reversal steps of the extension of the rail 100. The restoring operation is carried out by changing over the rigidity of the position control, and monitoring and controlling the driving forces.

The technical effects of this embodied control apparatus are as follows:

(a) Since the cooperating operations can be corrected by controlling the driving forces and monitoring the operations by detecting variations of positions and speeds, the displacement of the elements to be controlled between the positions to be set and the real positions, the sticking of the arcuated links of the rail and the generation of excessive stresses can be avoided.

(b) The position control for rotating the swing link is set free at the time when it is operated synchronously with the last arcuated link of the rail which is being extended and operated dependently. Thus the sticking of the elements to be controlled and the generation of excessive stresses can be prevented as in the item (a).

(c) When the rail is fixed at its distal end and supported at its central portion, the rigidity of the position control of the mechanisms supporting the rail is lowered. Accordingly, the reaction due to the fixture and the support of the rail is reduced, and excessive stresses are prevented from being applied to the mechanisms.

(d) Since the rail is position-controlled so as to be held in position at a high rigidity after the rail has been fixed, mechanical stability of the rail is securely maintained.

(e) Due to the fact that the rigidity of the position control of the vehicle and the arm can be lowered upon holding and setting the diverter plate, excessive reaction can be avoided even if positional errors of the elements to be controlled occur. The operational stability is ensured because the position control is changed to the one at a high rigidity upon transferring the diverter plate.

(f) When the vehicle is returned to the position of the support arm, excess stresses can similarly be prevented from being generated.

With this embodiment, the control apparatus uses servo motor controlling means for detecting driving forces. In addition thereto, sensors for forces or torques can be used in the driving mechanism. Synchronous operations and cooperating operations other than those as explained above can be performed by the control apparatus, and the same technical effects as explained above can be attained.

Further, in the embodied remote control maintenance apparatus, the vehicle 300 can be provided with a manipulator for maintaining the armor tiles.

7. The state in which the manipulator for maintaining the armor tiles of the first wall is operated on the vehicle In FIG. 20, the manipulator 360 is mounted on a foldable lift 361 which is movable vertically. The lift 361 is moved by a reciprocating mechanism (not shown) in the maintenance port in which the rail supporting device 250 is inserted and is positioned under the rail 100.

Figure 20:
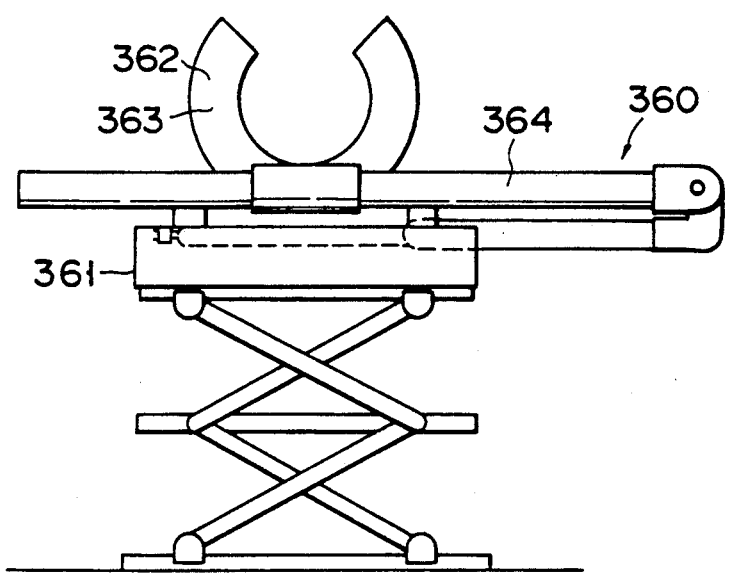
FIG. 20 is a side view of a manipulator for maintaining armor tiles and its lift.

The manipulator 360 mounted on the lift 361 comprises two rings 362 and 363 overlapped on each other, driving mechanism for rotating the rings 362 and 363 around their centers and a slide arm 364. The driving machanism for the rings is supplied power and control signal from the lift 36 through a connector (not shown). Each of the rings 362 and 363 has inner a diameter larger than the circumscribed circle of the rail 100 and is cut away through substantially 90°, as shown in FIG. 20. One slide ring 362 can be connected mechanically to the vehicle 300 and is provided with a connecting mechanism (not shown) for effecting the connection of signal lines and power lines. The other slide ring 363 slidably supports the slide arm 364 of the a manipulator 360 and is provided with a driving device (not shown).

Referring to FIG. 20, the lift 361 disposed under the rail 100 is raised. The rail 100 enters the space defined in the slide rings 362 and 363 through the cut-away portions thereof and is stopped at the position at which its center coincides with the rotating centers of the slide rings 362 and 363. The vehicle 300 is driven toward the slide ring 362 and is connected thereto by means of the connecting mechanism.

As the lift 361 is lowered, the connector between the manipulator 360 and the lift 361 is disconnected, and then the lift 361 is retracted from the torus space 2. As the vehicle is driven, the manipulator 360 is operated in the torus space 2 to be set at an arbitrary position at the wall of the torus space 2, thereby effecting the maintenance of the armor tiles 7.

Figure 21:
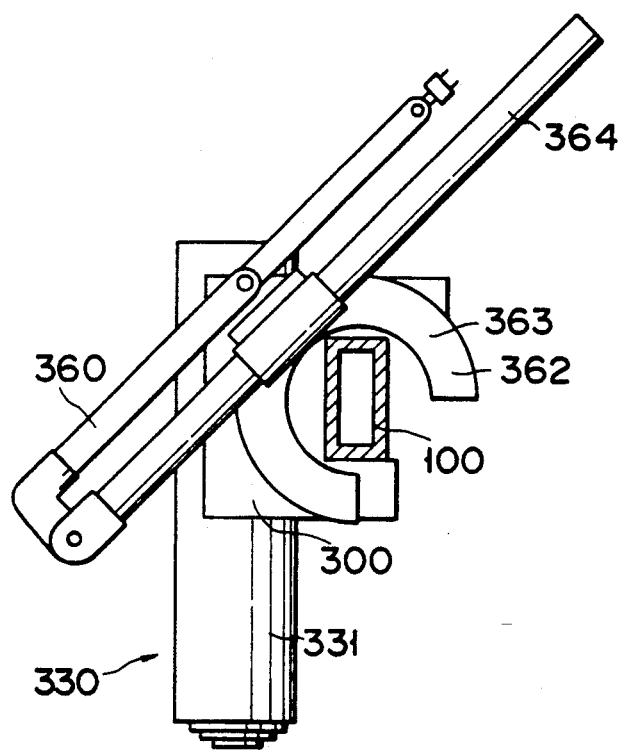
FIG. 21 shows a transitional state in which the manipulator mounted vehicle passes through a joint of the rail, as an example.

When the vehicle 300 passes over the joints 102 of the rail 100 the movable slide ring 363 is made completely overlapped on the fixed slide ring 362, as shown in FIG. 21, so that the slide ring 363 does not interfere with the joints 102, as shown in FIG. 21.

Referring to FIGS. 22 to 29, the manipulator 360 mounted on the vehicle 300 will now be explained in mroe detail.

Figure 22:
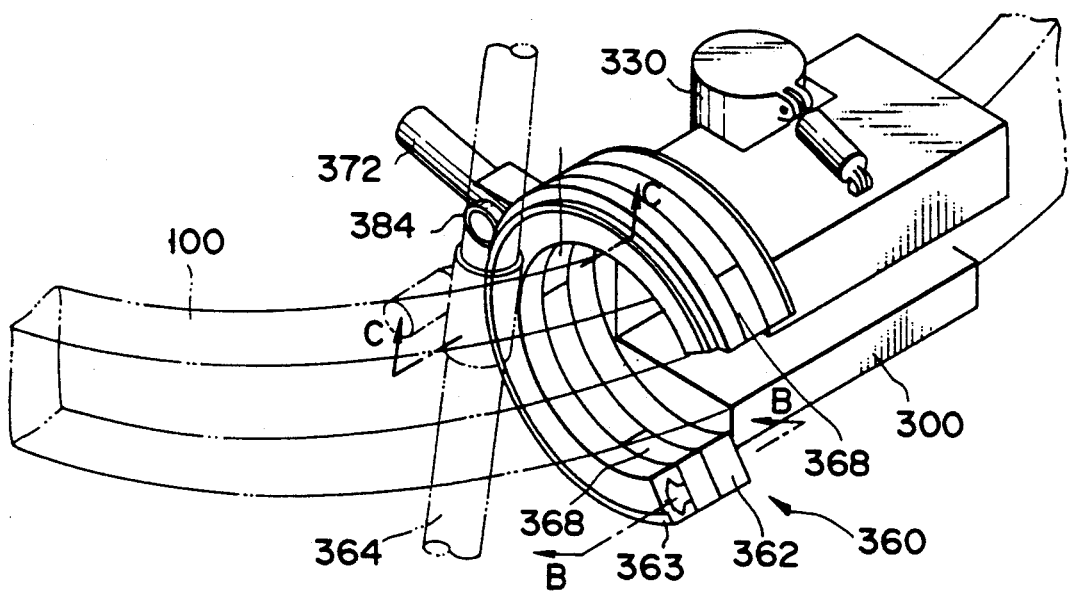
FIG. 22 is a schematic perspective view of the first modification of the vehicle on which a manipulator for maintaining armor tiles has previously been mounted.
Figure 23:
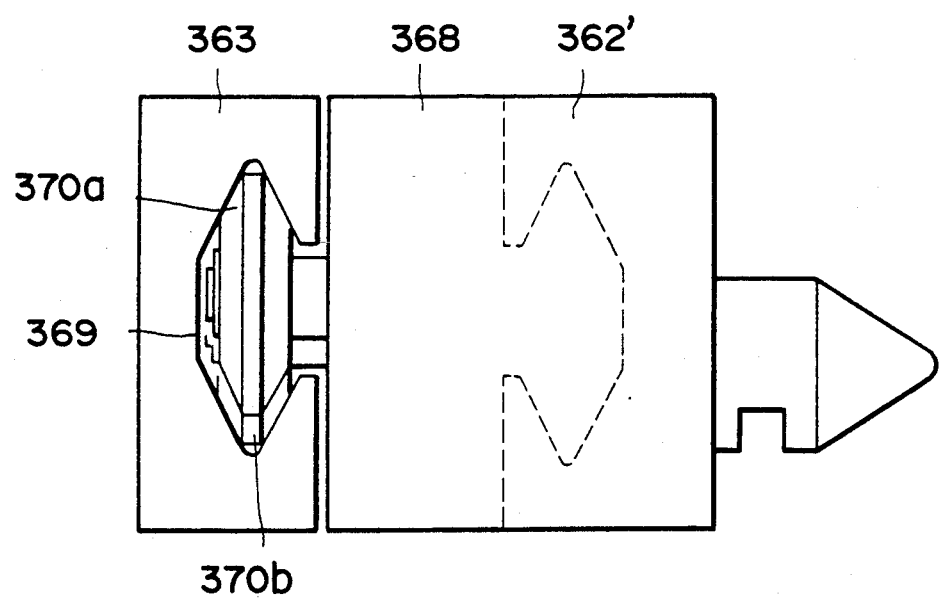
FIG. 23 is a cross-sectional view along line B—B of FIG. 22.
Figure 24:
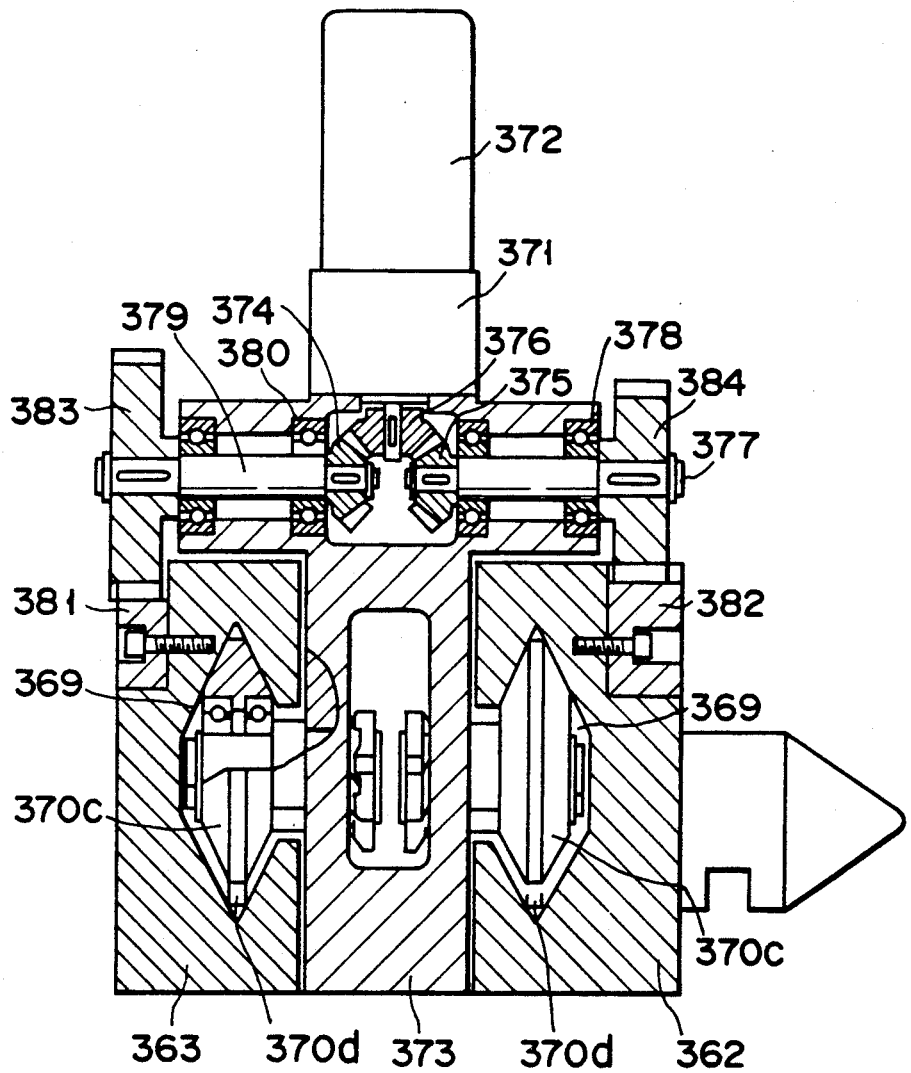
FIG. 24 is a cross-sectional view along line C—C of FIG. 22.

FIGS. 23 and 24 are cross-sectional views along line B—B and line C—C of FIG. 22, respectively.

As shown in FIGS. 23 and 24, the manipulator 360 has the partially cut-away fixed ring 362 detachably connected to the distal end of the vehicle 300. A guide groove 369 is formed in the fixed ring 362 so as to be extended in its circumferential direction. On the both cut-away end portions of the fixed ring 362 are provided blocks 368 to which rollers 370a and 370b are pivoted. The rollers 370a and 370b are rotatably inserted in a circumferentially extending guide groove 369 formed in the partially cut-away slide ring 363 having the similar cut-away as that of the fixed ring 362. Between the fixed ring 362 and the slide ring 363 is provided a gear case 373 connected to a driving motor 372 by means of a reduction device (reduction gearing) 371. The gear case 373 is provided on its both lateral sides with a plurality of rollers 370c and 370d which are guided and roller in the guide grooves 369 of the fixed ring 362 and the slide ring 363. A bevel gear 376 meshing with bevel gears 374 and 375 is fixed to output shaft of the reduction device 371. Shafts 377 and 379 are rotatably supported on the gear case 373 by means of bearings 378 and 380, respectively. The shaft 379 has one end fixed to the bevel gear 375 and the other end fixed to a spur gear 384 engaging with a spur gear 381 formed on the outer periphery of the slide ring 363, and the shaft 377 has one end fixed to the bevel gear 375 and the other end fixed to a spur gear 384 engaging with a spur gear 382 formed on the outer periphery of the fixed ring 362.

As shown in FIG. 28, the connecting portion 364a of the slide arm 364 of the manipulator 360 is fixed to the central portion of the slide ring 363. In FIG. 29, the distal end of the slide arm 36 of the manipulator 360 is provided with a joint R1 for rotating the distal end of the slide arm 364 around the axis of a slide arm 364 and a joint S1 for rotating the first arm 365 around the axis perpendicular to the axis of the joint R1. On the distal end of the first arm 365 is provided a joint S2 for rotating a second arm 366 around an axis parallel with the axis of the joint S1. On the distal end of the second arm 366 are provided a joint R2 rotating around an axis perpendicular to the axis of the second arm 366, a swing joint S3 rotating around an axis perpendicular to the axis of the joint R2 and a pivotal joint R3 for rotating a tool 390 around an axis perpendicular to the joint S3. Each of the joints R2, S3 and R3 has a driving mechanism (not shown), and they constitute a wrist 367 having three degrees of freedom.

The operation of the manipulator mounted vehicle 300 will now be explained.

When the fixed ring 362 and the slide ring 363 of the manipulator 360 overlap with each other as shown in FIG. 22, their cut-away portions enable the vehicle 300 to move along the rail 100, because the joints 102 of the rail 100 and the supporting portion of the rail supporting device 250 do not interfere with the cut-away portions of the rings 362 and 363.

In order to exchange the first wall 7 or the like, the vehicle 300 runs on the rail 100 to be set to a predetermined position at which the joints 102 and the rail supporting device 250 are not located. Then, the slide ring 363 is rotated through a predetermined angle by operating the driving motor 372 so that the slide arm 364 of the manipulator 360 is directed in the required direction.

As shown in FIGS. 23 to 27, when the driving motor 372 is rotated, the bevel gear 376 is turned via the reduction device 371, and the shafts 377 and 379 are rotated in the reverse directions to each other through the bevel gears 374 and 375 meshing with the bevel gear 376. The spur gear 381 engaging with the spur gear 383 turns the slide ring 363 through an angle $\beta$ defined by the gear ratio between the spur gears 383 and 381 with respect to the gear case 373, and the spur gear 382 engaging the spur gear 384 turns the gear case 373 through an angle $\alpha$ defined by the gear ratio between the spur gears 384 and 382 with respect to the fixed ring 362 in the same direction as the slide ring 363, with the result that the slide ring 363 rotates through an angle of $(\alpha+\beta)$ with respect to the fixed ring 362.

The slide ring 363 carrying the manipulator slide arm 364 is securely supported by the fixed ring 362 by means of the rollers 370a, 370b, 370c and 370d inserted in and guided by the guide grooves 369 formed in the both rings 362 and 363. In this connection, the manipulator 360 can be directed around the rail at any required direction (from 0° to 360°).

Referring to FIGS. 28 and 29, the joints of the manipulator 360 are operated by driving means (not shown) and change their posture in order to have an access to the first wall 7 formed in the reactor. The manipulator 360 has nine degrees of freedom defined by its rotation around the axis of the rail 100, its extension and shrinkage, its rotation about the axis of the slide arm 364, the swing of the first arm 365, the swing of the second arm 366, three degrees of freedom obtained by the wrist 367 and the running of the vehicle 300. The redundancy of freedom enables the manipulator to take several postures at which the manipulator is accessible to any part of the first wall 7. Therefor, the tool can reach any position which is close to the first wall 7 and at which the joints 102 of the rail 100 or the rail 100 itself is supported by the rail supporting device 250, or the directions of the slide arm 364 of the manipulator 360 is limited when the vehicle 300 is positioned at those positions.

The remote control maintenance apparatus used for a tokamak type nuclear fusion reactor and provided with the manipulator 360 explained above has the following technical advantages:

(a) The structure comprising a cut-away fixed ring 362 having the freedom of rotation around the rail, a slide ring 363 having the same shape as the fixed ring 362 and driving means for making a relative movement between both rings enables the vehicle to run on the rail without causing interference of the vehicle 300 with the elements such as the rail 100, its joints 102 and the rail supporting device 250, and the manipulator 360 can be used in any position where such elements are not disposed.

(b) By using two series of gear trains driven by a single driving motor 372, the rotation of the gear case 373 around the fixed ring 362 and the rotation of the slide ring 363 around the gear case 373 are carried out separately. Therefore, when the gear ratios are selected properly, the fixed ring 362, the slide ring 363 and the gear case 373 can be arranged so that they are most strongly supported by each other.

(c) Forming the fixed ring 362 and the slide ring 363 in the same shape having a cut-away portion permits the rings to be fixed to or removed from the vehicle 300 after mounting the rail.

(d) The manipulator 360 has eight degrees of freedom except the running of the vehicle 300 consisting of the rotation around the rail, the extension and shrinkage, the rotation around the slide arm, the swing of the first arm 365, the swing of the second arm 366 and the rotation of the wrist around the three axes. Thus, the tool is accessible to the whole area in the reactor having D-shaped vertical cross section. Further, when the rotation of the manipulator around the rail is limited due to the interference with the joints of the rail and the rail supporting device 250, its redundancy allows for an access to the required portion at the other position.

In this embodiment, the manipulator 360 is mounted on and detached from the vehicle 300 on the rail 100. However, it may be previously mounted on the vehicle 300.

FIG. 30 shows a modified vehicle 300' on both end portions of which manipulators 360 having the same structure as the one mentioned above are mounted. The two manipulators 360 cooperate to enhance their efficiency. One of them can be provided with a monitoring device such as a camera.

The remote control maintenance apparatus according to this invention can use a vehicle 300 provided with a manipulator 330 for exchanging the diverter plate as shown in FIGS. 20 to 22 and a manipulator 360 for exchanging the armor tiles as shown in FIG. 30, or a vehicle 300' provided with two manipulators 360 for exchanging only the armor tiles according to the operation to be performed.

When the rails are extended around the whole circumferential length in the torus space by using two rail mounting devices, two vehicles each running on the respective rail mounting devices through 180° in opposite directions can be used. Various combination of vehicles can be selected according to the operation to be performed. When one of the vehicles has become out of order in case where two vehicles are used, the other vehicle can be used so as to rescue the one which is out of order.

8. The way how to guide the cable

As explained above, the maintenance apparatus of this embodiment comprises driving means and rail mounting mechanisms mainly consisting of first and second links 203 and 204, a rail carriage 202 and a vehicle 300 or vehicles 300 and/or a vehicle 300' or vehicles 300'. Cables are connected to the rail mounting mechanisms and are operated so as to move the mechanisms. The ways how to operate the cable to the vehicle will now be explained.

FIG. 31 shows the state in which the cable 400 is housed when the rail 100 is contained in the cask. The cable 400 connected to the vehicle 300 is supported by the later described cable supports 401 provided on the joints 102 and extends along the links 101. The cable 400 passes over the swing link 201 and crosses the slide link. Then, the cable 400 passes between cable feeding rollers 402 provided on the rail carriage 202 and operated by driving means (not shown) for taking off the cable 400 and is taken up through a cable feeding roller 402 by means of a cable drum 403 provided with a driving mechanism (not shown) for taking up the cable 400. The cable 400 is connected to a control device (not shown).

The structure of the cable support 401 provided on the joint 102 will now be described. As shown in FIG. 3, the cable support 401 has the openable lever 404 which is normally closed and opened when it is pushed. The cable support 401 has a U-shaped cable receiver 405 which is rotatably supported on the support shaft 406. Rollers 405A are mounted on the arms of and the inner bottom of the cable receiver 405. The support shaft 406 is supported by the joint 102 and is swingable around the axis of the joint 102. A limiting mechanism (not shown) is provided so that the support shaft 406 is disposed on a line always passing the substantial center of the angle defined by the links 101 on both sides of the joint 102 when the links 101 are swung.

The operation of the cable 400 for moving the rail 100 and the vehicle 300 will now be explained.

When the distal end of the rail 100 is advanced in the maintenance port 9 toward the center of the torus space 2, the cable is moved together with the rail 100.

After the links 102 of the rail 100 have been arranged linearly and the link 204 together with the rail carriage 202 has been moved into the maintenance port 9, the support arm 205 swings in the torus space 2. The cable 400 is continuously taken off from the cable drum 403 until the support arm 205 is stopped at the predetermined position.

Figure 32:
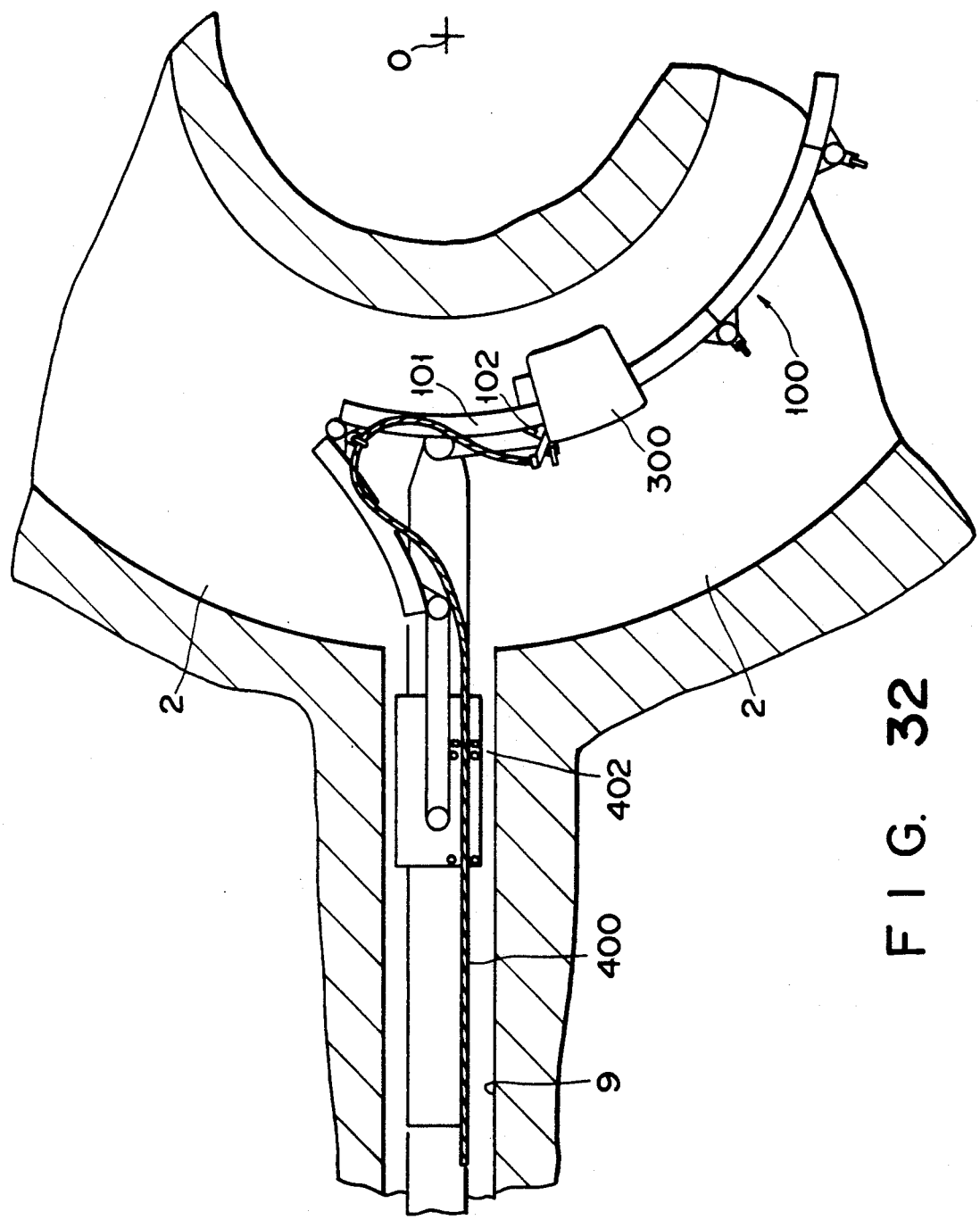
FIGS. 32 and 33 are schematic plan views showing how to handle the cable when the rail is extended in the torus space.

As the links 101 are swung about the associated joints 102 located at the proximal end of the vehicle 300 upon extending the rail 100 in the torus space 2, the cable 400 are sent by the cable feeding rollers 402 and the cable drum 403 toward the center of the torus space 2 to assume the state as shown in FIG. 32.

Figure 33:
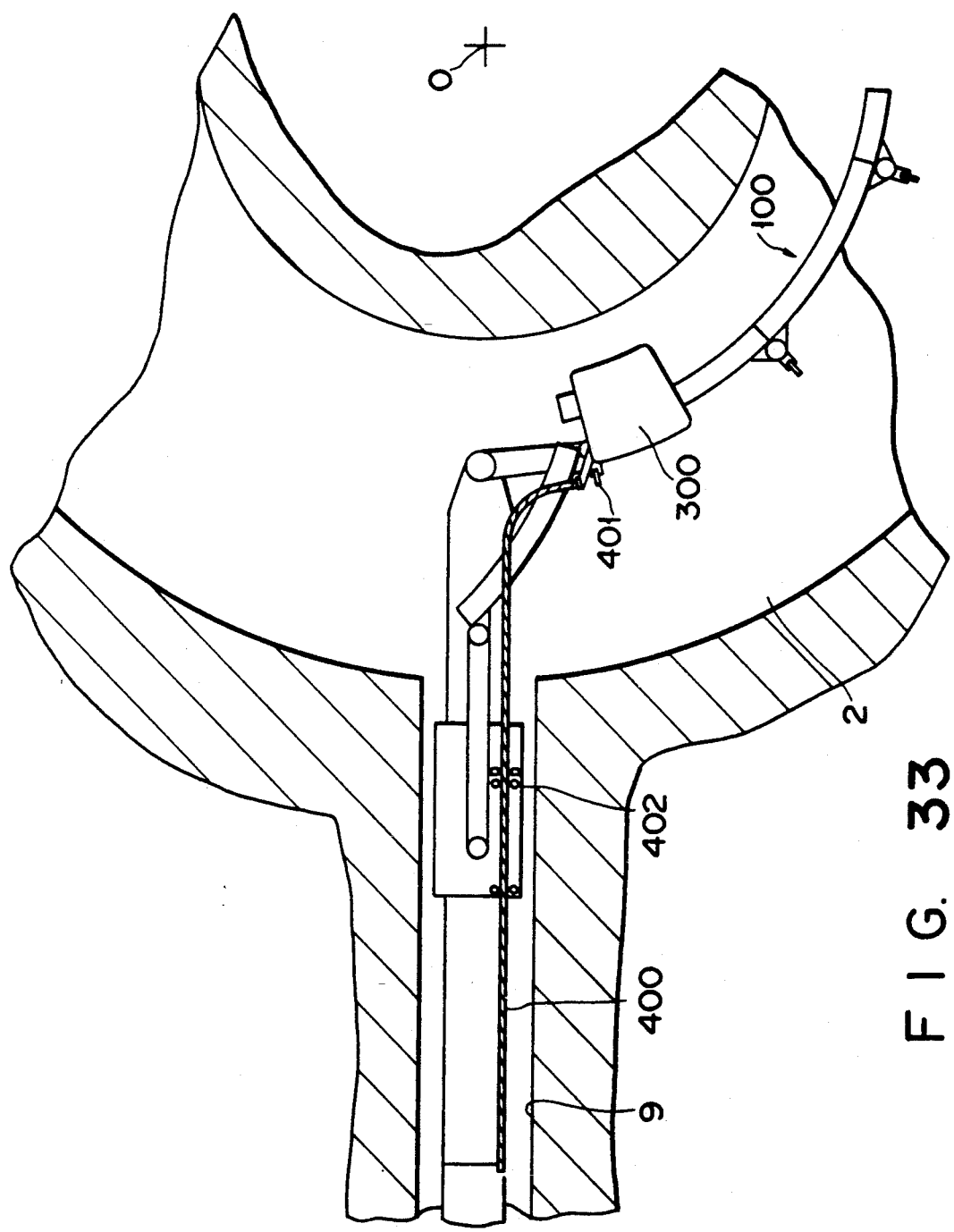
Figure 35:
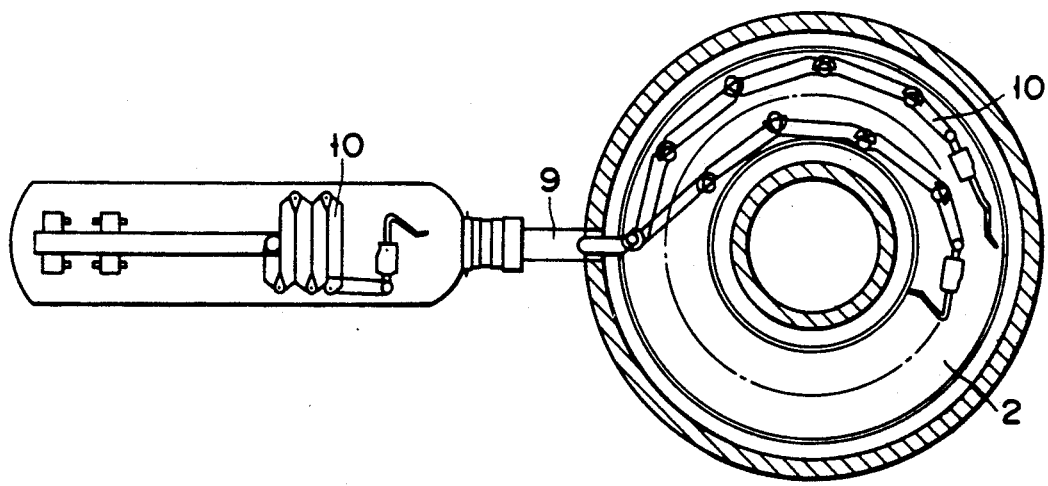
FIG. 35 is a schematic plan view of a conventional remote control maintenance apparatus.

When the vehicle 300 extends the rail 100, the cable 400 is pulled toward the cask by means of the cable feeding rollers 402 and the cable drum 403 to assume the state as shown in FIG. 33. As the joint 102 approaches the vehicle 300, the lever 404 of the cable support 401 is opened by a projection (not shown) formed on the vehicle 300 so that the cable 400 comes off the cable support 401 and only the rail 100 is extended.

As the vehicle 300 is moved toward the distal end of the rail 100 therealong, the cable 400 is taken off by the cable feeding rollers 402 and the cable drum 403. At the time when the vehicle 300 passes over the joint 102, the lever 404 is opened by the projection (not shown) formed on the vehicle 300. The cable 400 is received by the cable receiver 405 and is smoothly guided by means of the rollers 405A.

In the process in which the vehicle is moved toward the maintenance port, the cable 400 is pulled in by means of the cable feeding rollers 402 and the cable drum 403. When the vehicle 300 runs over the joint 102, the lever 404 of the cable support 401 is opened so that it comes off the cable support 401.

The above description made to the vehicle 300 is also applicable to the vehicle 300'.

The above-mentioned remote control maintenance apparatus according to this embodiment has the following technical features:

(A) In the apparatus, the rail 100 comprising a plurality of arcuated links 101 is housed in a folded state and the first and second slide links 203 and 204 are also housed in an overlapping state. Thus, the whole apparatus can pass through a narrow maintenance port and can be stored in a limited space.

(B) Since the joints 101 cannot swing beyond the continuous arch defined by them when they are extended, an arcuated rail is easily formed without a complicated control.

(C) The vehicle 300 is fixed to the support arm 205 and supports the distal end of the rail. Therefore, the rail 100 can be extended at the required position by positioning the support arm 205 at the required angle.

(D) The vehicle 300 is not only moved along the rail by means of the driving mechanism of the vehicle but also can be fixed to the support arm 205 so that the extending of the rail 100 is facilitated. This simplifies the structure of the apparatus.

(E) Because the joints 102 are locked when the links 101 which the rail 100 comprises form a continuous arc, the rigidity and the strength of the rail 100 are ensured. The locking mechanism is driven by the driving device provided on the vehicle 300, simplifying the structure of the joints. Further, a narrow rectangular projection is formed on the inner end of the support shaft portion of the hook. This structure allows the rail to be extended without performing a special operation such as a retarding operation after the hook has been locked or unlocked, thereby simplifying the structure of the hook.

(F) The rail 100 are folded or unfolded by moving the joints 102 of the rail 100 by means of the joint roller holder 210 and the rail carriage 202. Thus, it is unnecessary to provide on the joints 102 any driving mechanisms for folding or unfolding the rail 100. This simplifies the structure of the joints 102.

(G) When the rail 100 is extended in the torus space, the undersurface of the rail is supported by means of the guide roller 254 of the rail holding device 250. This makes the extension of the rail 100 stable and the positional accuracy for extending the rail is ensured.

(H) After having been extended by half the circumferential length in the tours space, the rail 100 is supported by the rail supporting device 250 projected from the adjacent maintenance port and the distal end of the rail is held by the rail supporting device positioned from another maintenance port. With this structure, the rigidity of the rail is enhanced and the apparatus is operated stably, thereby rendering the apparatus miniaturized and light in weight.

When the distal end of the rail is fixed, it is unnecessary to swing the extended whole rail, thereby enabling the apparatus to be operated in a stable state.

(I) The provision of another rail which is extended through the maintenance port diametrically aligned therewith and on which the vehicle runs improves the operational efficiency.

(J) Since the frame of the vehicle 300 has a channeled cross-section, the vehicle 300 can run without interfering with the joints 102 and the rail supporting device 250. Further, it is unnecessary to retract the rail supporting device 250 when the vehicle 300 pass, thereby the rigidity of the rail is not lowered.

(K) The telescopic structure of the manipulator provided on the vehicle 300 allows the manipulator itself to be moved in the maintenance port in a shortened state and to operate at a large stroke.

(L) The swingable movement of the manipulator around the axis along the rail permits the end effecter to be set at an arbitrary position in the predetermined operational area.

(M) Since the manipulator for 360 maintaining the armor tiles is fed through another maintenance port and is mounted on the vehicle, the vehicle driving mechanism and the rail mounting mechanism can be used when the armor tiles are maintained, thereby simplifying the structure of the manipulator and allowing for a quick exchange between the maintenance of the diverter plate and the maintenance of the armor tiles.

(N) The manipulator can be used in a wide operational area due to the fact that the whole manipulator can be rotated around the rail.

(O) Eight degrees of freedom provided for the wrist 367 of the manipulator 360 allows the wrist 367 to have an access to any required position in the torus space 2.

(P) The signals for the driving power which are required for driving the manipulator are transmitted from the vehicle to the manipulator via the connecting mechanism. This arrangement simplifies the guidance of the cable connected to the vehicle 300.

(Q) In the system in which adjacent maintenance port is used through which rail supporting device 250 is fed, the usage of the transportation of the diverter plate simplifies the structure and the operation of said rail supporting device 250 and increases its operational efficiency.

(R) The provision of the cable supports on the links 102 of the rail 100 prevents the cable from being excessively stretched or loosened or tangling together.

(S) The cable support is rotatably supported and the limiter is provides so that it is positioned on the central line of the angle defined between the adjacent links so that the cable is not caught between the adjacent links or is not excessively bent.

In the above-mentioned embodiment, another rail 100' projects from diametrically opposed another maintenance port so as to be extended in the torus space in a continuous arc. Alternatively, only the rail supporting device 250 is inserted in said another maintenance port to fix the distal end of the first rail 100. When, therefore, no maintenance is required over the whole length of the rail, the operation of the rail can be simplified.

In the above-mentioned apparatus, the manipulator for the armor tile maintenance is inserted in said another maintenance port and is mounted on the vehicle 300 by means of the rings 362 and 363. In place of the manipulator, an inspection device or any other maintenance device can be used so that a variety of maintenance can be performed and the efficiency is enhanced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A remote control apparatus for maintaining a tokamak type nuclear fusion reactor comprising a vessel having a torus space formed therein and a plurality of maintenance ports extending radially for communicating said torus space with the outside of said vessel, and in-vessel components arranged in said vessel, comprising:

a rail having generally similarly arcuated links pivoted to one after another and extendable in the circumferential directions in said torus space, said links forming, in said torus space, a continuous semi-circular arc having a center substantially coincident with a center of said torus space when said links are extended;

a vehicle carrying at least one manipulator for handling said in-vessel components and guided along said rail extended in said torus space;

rail housing means arranged outside of said vessel, for housing said rail when said remote control device is not used;

rail mounting means supporting the last link of said rail and delivering, into said torus space, said links housed in said rail housing means from the first link to the last link in succession through one of the maintenance ports and causing the links to form the continuous semi-circular arc; and a rail supporting device inserted in said torus space through another maintenance port adjacent to the first mentioned maintenance port, for supporting a central portion of said rail.

2. An apparatus according to claim 1, wherein said rail comprises a plurality of joints for preventing the adjacent arcuated links from rotating inwardly thereof and allowing said adjacent arcuated links to rotate outwardly, and said rail housing means guides said arcuated links in a folded state on one after another by rotating said arcuated links outwardly around the respective joints.

3. An apparatus according to claim 1, wherein said rail mounting means comprises a fixed guide fixed at the outside of said torus space at a position on a line extended from said one maintenance port, slide links slidable in said one maintenance port and a rail carriage movable along said slide links for sending said arcuated links in succession from said rail housing means into said torus space through said one maintenance port.

4. An apparatus according to claim 3, wherein one of said slide links is a second link driven along said fixed guide and the other link is a first link driven along said second link and having guide means for sending said arcuated links in said one maintenance port.

5. An apparatus according to claim 4, wherein said first link has an end close to said torus space and a support arm drivingly pivoted to said end, said rail carriage has fixed thereto a swing link pivoted by means of one of said joints to the arcuated link which is sent to said torus space last, for supporting said rail via said joint which is sent last when said rail is extended to form a continuous arc in said torus space.

6. An apparatus according to claim 5, wherein said first slide link has a guide groove for housing rollers and a roller holder driven along said guide groove, for causing said rollers of said rail to slide in said guide groove for a predetermined stroke (A).

7. An apparatus according to claim 5, wherein said vehicle is detachably mounted on said support arm and has driving means for moving said arcuated links along said arc defined by the extended arcuated links.

8. An apparatus according to claim 5, wherein said swing link is intermittently driven for sending said arcuated links from said rail housing means to said first slide link, said roller holder reciprocates in said guide groove in synchronism with said swing link, and said driving means for moving said vehicle are driven in synchronism with said swing link and said roller holder.

9. An apparatus according to claim 1, wherein said rail has a plurality of mechanical locking mechanisms for locking the adjacent arcuated links so as not to be pivoted when said adjacent links form an arc, and said vehicle has operating means for actuating said mechanical locking mechanisms.

10. An apparatus according to claim 9, wherein each of said mechanical locking mechanisms comprises a hook having a support shaft pivoted to an end of one of the adjacent two arcuated links, said support shaft being provided with a projection extending toward an inner side of said one arcuated link, and said operating means has a recess engaging with said projection.

11. An apparatus according to claim 1, wherein said rail has a projection formed on an outer periphery of the arcuated link adjacent to said another maintenance port, and said rail supporting device comprises a base disposed at the outside of said torus space, a slide link reciprocating along said base in said another maintenance port and having a distal end which is accessible to said rail when said slide link is advanced, and a pair of holding members provided on said distal end of said slide link, for firmly holding said projection of said rail.

12. An apparatus according to claim 11, wherein said distal end of said slide link has a guide roller for supporting an undersurface of the respective arcuated link of said rail moved in an circumferential direction of said torus space in said torus space when said rail is extended in said torus space, said guide roller being selectively moved to a position at which said roller supports said respective arcuated link and to a position remote from said respective arcuated link.

13. An apparatus according to claim 1, further comprising an in-vessel component transporting device disposed below said rail supporting device, for transporting said in-vessel components from an interior of said torus space to the outside thereof and from the outside of said torus space to said interior thereof through said another maintenance port.

14. An apparatus according to claim 1, wherein said vehicle is detachably provided with another manipulator and a transporting device transports said another manipulator.

15. An apparatus according to claim 1, wherein said vehicle is movable over the whole length of said rail extended in said torus space, and comprises a frame having an inner passage, an opening for preventing interference with said joints of said rail and said projection adapted to be held by the paired holding members and a plurality of wheels rolling on an outer surface of said rail.

16. An apparatus according to claim 15, wherein said vehicle driving means has a servo motor and a pinion driven by said servo motor, and said arcuated links are provided in an inner surface thereof with a rack engageable with said pinion.

17. An apparatus according to claim 1, further comprising a cable system comprising cable means connected to said vehicle, for supplying a power to said vehicle from the outside thereof and transmitting signals between said vehicle and an external control device, a cable drum disposed at the outside of said torus space, for taking up and taking off said cable means, a drive roller rotatably mounted on said rail carriage, for moving said cable means in a direction according to a position of said swing link, and a plurality of cable supports mounted on the respective joints, for taking up and taking off said cable means.

18. An apparatus according to claim 3, wherein said swing link firmly supports a distal end portion of an arcuated link at a distal end of another rail extended through said another maintenance port after the last arcuated link has been sent into said torus space so as to form a circular rail assembly together with the first mentioned rail in said torus space.

19. An apparatus according to claim 18, wherein said vehicle is moved along said first mentioned rail and said another rail.

20. An apparatus according to claim 1, further comprising a plurality of driving mechanisms with servo motors at least for extending and restoring the rail and for handling said in-vessel components, and a control device for said plurality of driving mechanisms, said control device including:
   controlling means for controlling said mechanisms in position, speed and force;
   monitoring means for monitoring said mechanisms in operating force and position, and for signaling a measured data to monitor the operating condition of said mechanisms;
   performing changeover means for changing the operating mode of said controlling means to change the rigidity of the position control for said mechanisms depending on the monitored operating condition of said mechanisms; and
   generating command means for generating commands to correct said mechanisms in position, speed and force depending on the monitored operating condition of said mechanisms.

21. An apparatus according to claim 1, wherein said vehicle carries a manipulator having a telescopic arm and an actuator for swinging said telescopic arm in a plane perpendicular to said rail.

22. An apparatus according to claim 2, further comprising rotatable rollers coaxially provided under said joints, said rail housing means having a guide groove for guiding said rollers, and said guide groove being formed in a circular form.

* * * * *